US 6,571,165 B2

(12) United States Patent
Maruko et al.

(10) Patent No.: US 6,571,165 B2
(45) Date of Patent: May 27, 2003

(54) METHOD AND SYSTEM FOR CONTROLLING STAND-BY BRAKING TORQUE APPLIED TO AUTOMOTIVE VEHICLE

(75) Inventors: Naoki Maruko, Kanagawa (JP); Minoru Tamura, Yokohama (JP); Hideaki Inoue, Yokohama (JP); Takayuki Watanabe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/049,565

(22) PCT Filed: Aug. 2, 2001

(86) PCT No.: PCT/JP01/06642
§ 371 (c)(1),
(2), (4) Date: Feb. 15, 2002

(87) PCT Pub. No.: WO02/14128
PCT Pub. Date: Feb. 21, 2002

(65) Prior Publication Data
US 2002/0107629 A1 Aug. 8, 2002

(30) Foreign Application Priority Data
Aug. 17, 2000 (JP) .......................... 2000-247161

(51) Int. Cl.$^7$ .............................................. B60K 31/00
(52) U.S. Cl. ..................... 701/93; 701/96; 701/301; 340/435
(58) Field of Search ...................... 701/93, 96, 70, 701/301; 303/125, 191, 192; 340/435, 903

(56) References Cited

U.S. PATENT DOCUMENTS

| | | | | |
|---|---|---|---|---|
| 5,234,071 A | * | 8/1993 | Kajiwara | 180/169 |
| 6,405,121 B2 | | 2/2001 | Tamura et al. | 701/96 |
| 6,272,416 B1 | | 8/2001 | Kuroda et al. | 701/70 |
| 6,282,483 B1 | * | 8/2001 | Yano et al. | 701/96 |
| 6,296,326 B1 | | 10/2001 | Steiner et al. | 303/125 |

FOREIGN PATENT DOCUMENTS

| | | |
|---|---|---|
| DE | 197 45 128 | 4/1999 |
| DE | 199 05 034 | 9/1999 |
| EP | 0 874 149 | 10/1998 |
| EP | 0 941 903 | 9/1999 |
| JP | 6-24302 | 2/1994 |
| JP | 7-144588 | 6/1995 |
| JP | 8-80822 | 3/1996 |

* cited by examiner

Primary Examiner—William A Cuchlinski, Jr.
Assistant Examiner—Marthe Y. Marc-Coleman
(74) Attorney, Agent, or Firm—Foley & Lardner

(57) ABSTRACT

The present invention pertains a method and a system for controlling a stand-by braking torque applied to an automotive vehicle under a condition of approaching or following an obstacle preceding the vehicle, the automotive vehicle having a powering system for applying a driving torque to the vehicle in response to an operator power demand. A brake controller executes a series of instructions for determining a variable indicative of dynamic situation of the vehicle, for sampling the determined values of the dynamic situation indicative variable immediately before an operator braking action to reduce the speed of the vehicle is imminent, for using the sampled values of the dynamic situation indicative variable as a basis to establish a parameter, and for using the established parameter as a basis to determine a target value of stand-by braking torque.

20 Claims, 13 Drawing Sheets

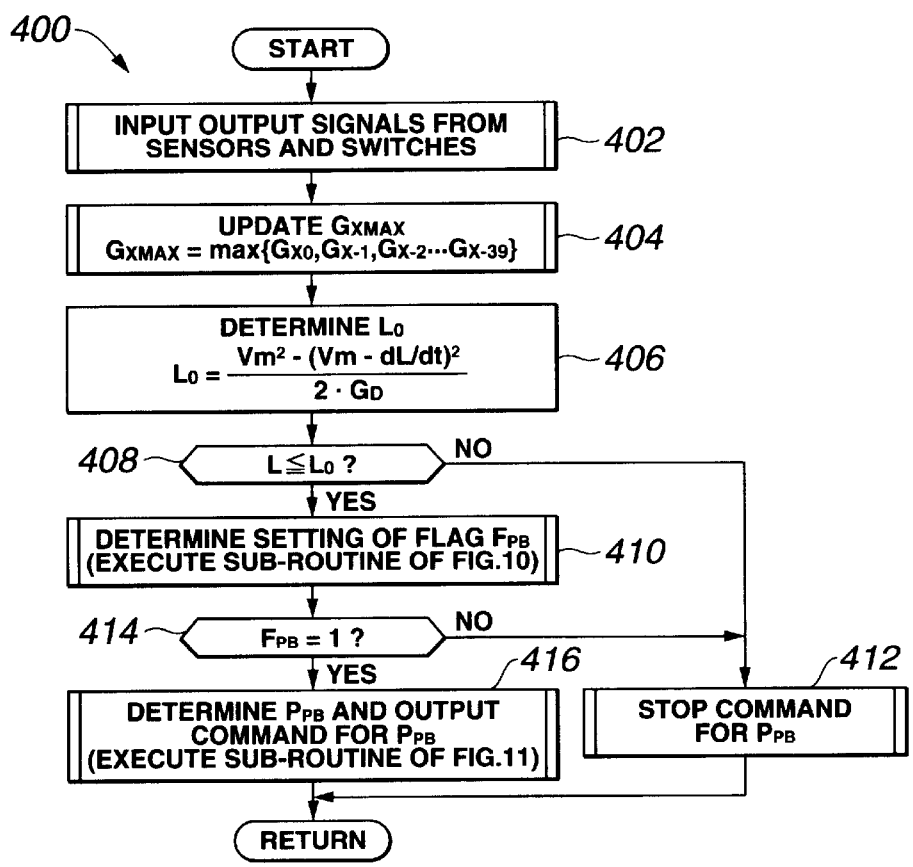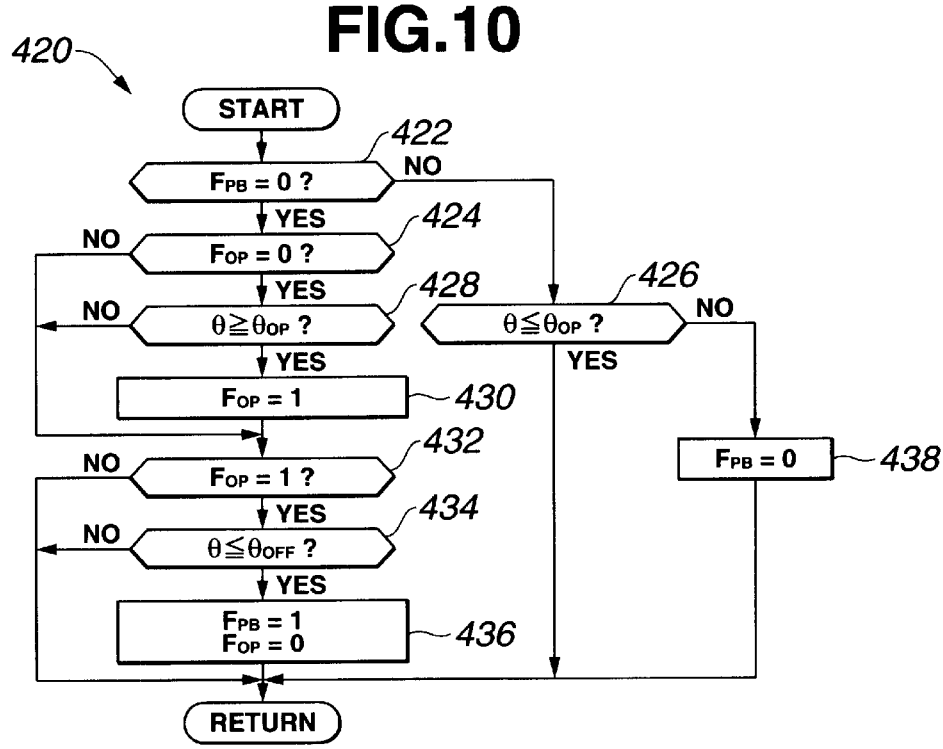

METHOD AND SYSTEM FOR CONTROLLING STAND-BY BRAKING TORQUE APPLIED TO AUTOMOTIVE VEHICLE

BACKGROUND OF THE INVENTION

The present invention relates to a method and a system for controlling a stand-by braking torque applied to an automotive vehicle under a condition of approaching or following an obstacle preceding the vehicle. The term "obstacle" is used herein to mean a stationary or moving object within the path of the vehicle, for example, vehicles, pedestrians, etc.

JP-A 7-144588 discloses a system whereby traveling speed and deceleration of an obstacle preceding a host vehicle are determined using a Doppler sensor and a vehicle speed sensor, which are on the vehicle, and a desired distance from the obstacle is determined. In this system, a vehicle operator is warned and an automatic braking action is initiated if the distance from the obstacle becomes less than the desired distance.

Other systems have been proposed that are intended to initiate braking action before a vehicle operator initiates braking action. JP-A 8-80822 discloses a system whereby, when the time rate of change of an accelerator angle upon operator releasing the accelerator pedal exceeds a predetermined level, a brake actuator is activated to partially activate a braking system before the foot of the operator is stepped on the brake pedal.

The action required under such proposed procedures, whether to apply stand-by braking torque, is intrusive. Inaccurate indications that the vehicle operator braking action is imminent, requiring application of stand-by braking torque prior to the operator braking action, can reduce vehicle operator satisfaction and can reduce confidence in the control system. Such inaccurate indications should therefore be minimized.

Many automatic vehicle control approaches are subject to frequent inaccurate indication conditions. Such inaccurate indication conditions may result from modeling error. For example, mathematical models determining conditions under which stand-by braking torque is applied may be oversimplified, relying on broad assumptions about vehicle behavior and operator requirements. Use of such proposed models has resulted in limited commercial acceptance of automatic vehicle control.

An object of the present invention is to provide a method and a system for controlling stand-by braking torque applied to an automotive vehicle in a manner not to reduce vehicle operator satisfaction in the system.

SUMMARY OF THE INVENTION

The present invention provides a method for controlling a stand-by braking torque applied to an automotive vehicle under a condition of approaching or following an obstacle preceding the vehicle, the automotive vehicle having a powering system for applying a driving torque to the vehicle in response to an operator power demand, the method comprising:

determining a variable indicative of dynamic situation of the vehicle;

sampling the determined values of the dynamic situation indicative variable immediately before an operator braking action to reduce the speed of the vehicle is imminent;

using the sampled values of the dynamic situation indicative variable as a basis to establish a parameter; and using the established parameter as a basis to determine a target value of stand-by braking torque, which is to be applied when the operator braking action to reduce the speed of the vehicle is imminent.

BRIEF DESCRIPTION OF THE DRAWINGS

Further objects and advantages of the invention will be apparent from reading of the following description in conjunction with the accompanying drawings.

FIG. 9 is a flowchart illustrating a series of operations of a main routine for carrying out the preferred embodiment of this invention.

FIG. 10 is a flowchart illustrating a series of operations of a sub-routine for determining setting of a stand-by braking in-progress flag ($F_{PB}$).

BEST MODES FOR CARRYING OUT THE INVENTION

Figure 1:
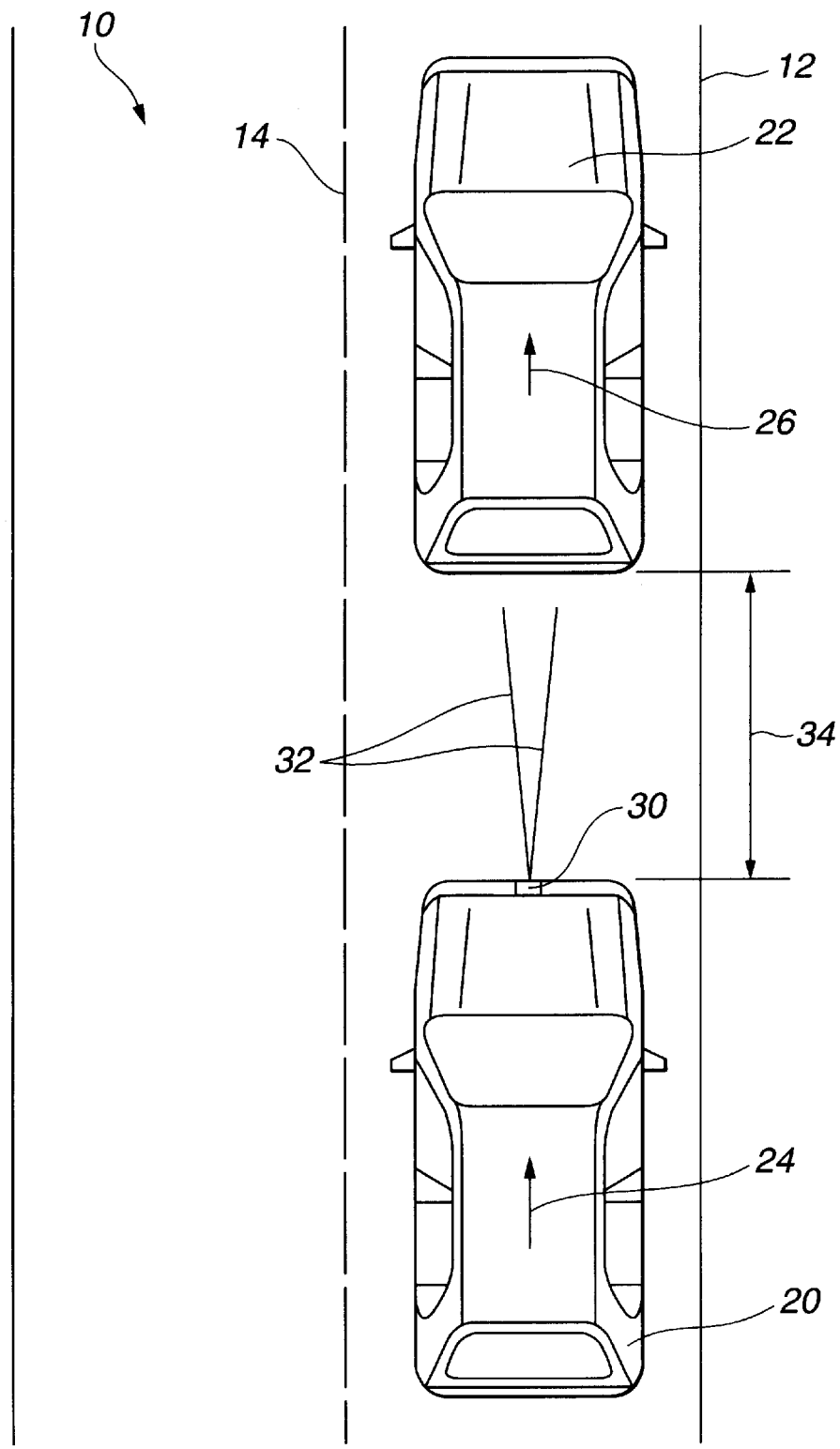
FIG. 1 is a plan view of an obstacle avoidance situation on a straightway.

FIG. 1 shows a typical situation on a straightway 10 having an edge 12 and a centerline 14, in which a fast moving automotive vehicle 20 is approaching an obstacle, in the form of a slow moving vehicle 22, from behind. Vehicle 20 is moving at a velocity in the direction of an arrow 24, and vehicle 22 at a velocity in the direction of an arrow 26. In FIG. 1, arrows 24 and 26 are vectors so that their lengths represent the magnitude of the velocities. In the front portion of vehicle 20, an obstacle recognition system 30, shown schematically, scans roadway 10 within an angular field 32. In this case, vehicle 22 in front is located inside angular field 32 and vehicle 20 is spaced at a distance 34. On the basis of evaluation of the environmental data from detection system 30, vehicle 20 will recognize the illustrated situation as a situation in which there is a need for operator braking action to reduce the vehicle speed. In this situation, it is required for the vehicle operator to release the accelerator prior to braking action. In a preferred embodiment, control logic is employed to determine that operator braking action is imminent in response to a reduction in accelerator angle in the situation in which a need for operator braking action remains, and to apply stand-by braking torque upon determination that operator braking action is imminent. Application of stand-by braking torque is adapted for assist in vehicle operator braking action. In another embodiment, control logic may be employed to determine that operator braking action is imminent when speed of reduction in accelerator angle exceeds a threshold.

Figure 2:
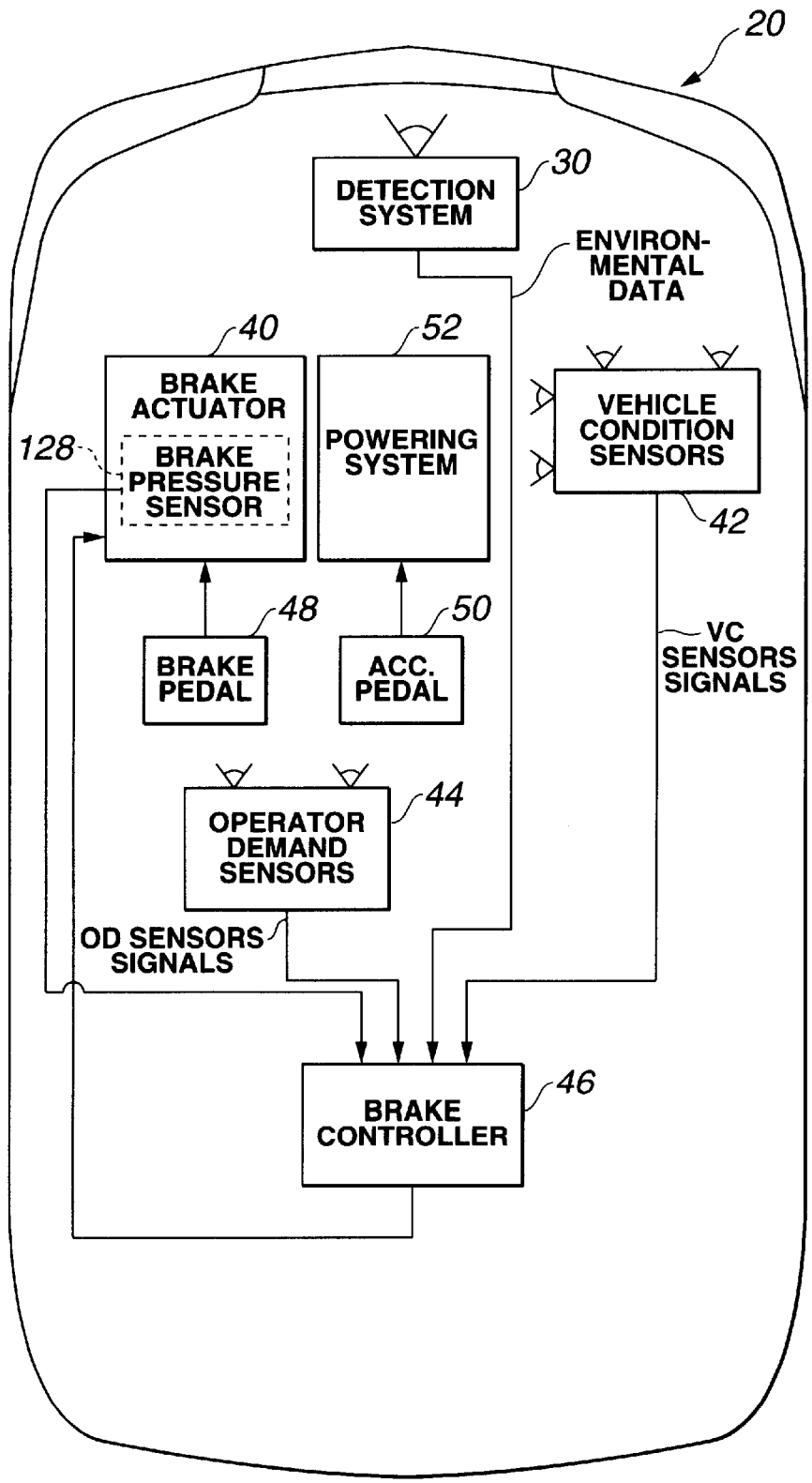
FIG. 2 is a schematic block diagram showing the arrangement of one representative implementation of a system for controlling stand-by braking torque applied to an automotive vehicle under a condition of approaching or following an obstacle preceding the vehicle.

FIG. 2 provides arrangement of one representative implementation of a system for controlling stand-by braking torque in vehicle 20. The system determines a target value of stand-by braking torque and a command for the determined target braking torque. The command is applied to a brake actuator 40. For this purpose, environmental data furnished by detection system 30, vehicle condition (VC) sensors signals from vehicle condition (VC) sensors 42, and operator demand (OD) sensors signals from operator demand sensors 44 are supplied to a brake controller 46. OD sensors 44 include a sensor for detecting operator deceleration demand expressed through a brake pedal 48 and a sensor for detecting operator power demand expressed through an accelerator or accelerator pedal 50. Operator power demand is applied to a powering system 52. In the embodiment, powering system 52 is a power train including an internal combustion engine, and a transmission. The engine has various engine speeds and engine torques. The transmission has various speed ratios between an input member driven by the engine and an output member drivingly coupled with at least one of wheels of vehicle 20. In a preferred embodiment, brake actuator 40 employs hydraulic fluid, such as oil, as working medium.

Figure 3:
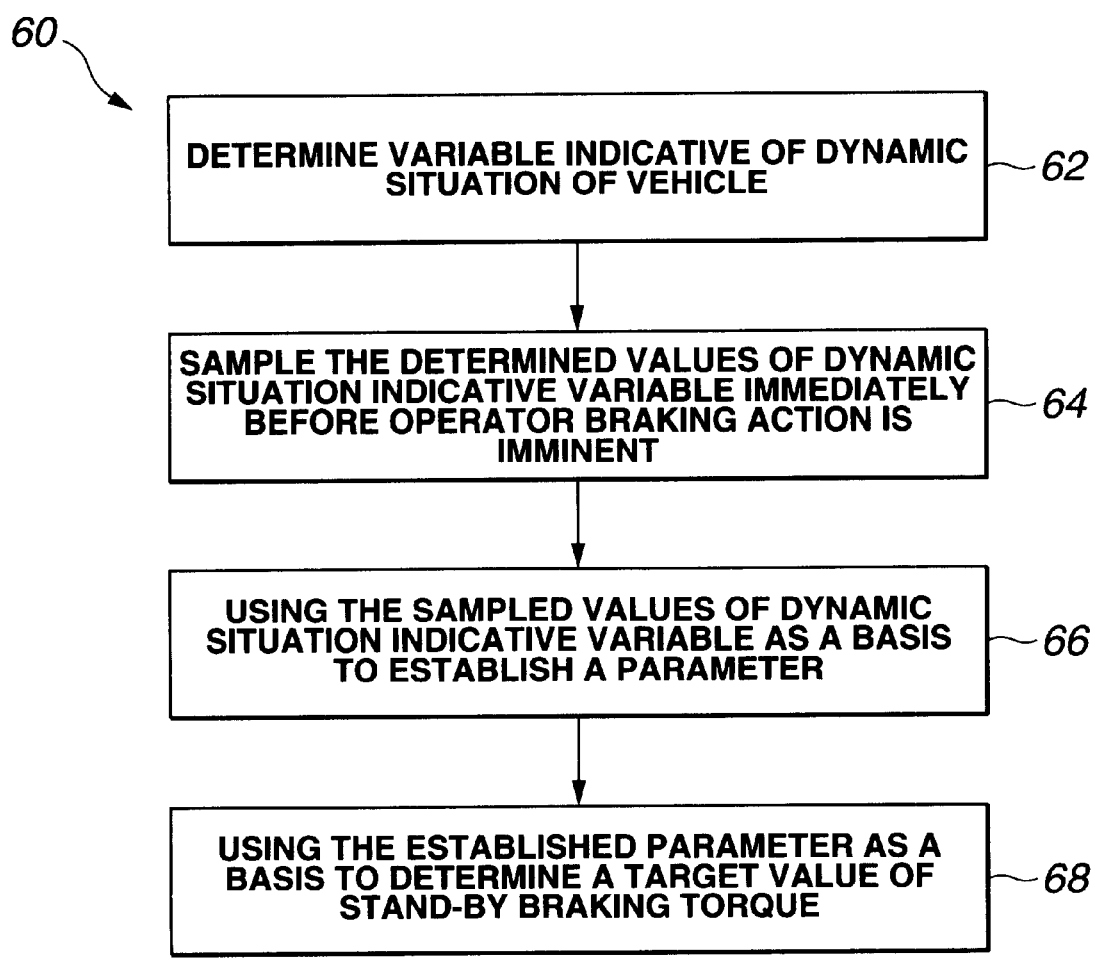
FIG. 3 is a block diagram illustrating a method of the present invention for controlling stand-by braking torque.

Referring to FIG. 3, a method of the present invention is generally indicated at 60. At block 62, a variable indicative of dynamic situation of a vehicle is determined. In a preferred embodiment of the present invention, longitudinal acceleration (Gx) to which vehicle is subject to is determined as the dynamic situation indicative (DSI) variable. In another preferred embodiment of the present invention, accelerator angle (θ) or position is detected as DSI variable. In still another preferred embodiment of the present invention, product of (accelerator angle, θ) and (speed ratio, F) is determined as DSI variable. It will be appreciated that there is good approximation between product, θ×F, and longitudinal acceleration, Gx, during traveling on a flat road. It will also be appreciated that product θ×F has a good approximation to driving torque at the transmission output member. In other embodiment of the present invention, driving torque is determined as DSI variable. In still other embodiment of the present invention, engine torque is determined as DSI variable.

At block 64, the determined values of DSI variable immediately before operator braking action is imminent are sampled. A predetermined number of determined values of DSI variable are sampled.

At block 66, the sampled values of DSI variable are used as a basis to establish a parameter. In other words, the parameter is established based on the sampled values of DSI variable. In a preferred embodiment of the present invention, the maximum of the sampled values is used as the parameter.

At block 68, the established parameter is used as a basis to determine a target value of stand-by braking torque. In other words, a target value of stand-by braking torque is determined based on the established parameter.

It is to be appreciated that the language "established parameter" is meant to encompass also other parameter resulting from appropriate processing and/or evaluation of the sampled values of DSI as long as it represents significant characteristic of vehicle dynamic situation, which actively induces operator anticipation of longitudinal deceleration of a vehicle upon releasing accelerator.

Extensive study conducted by the inventors have led them to find an inventive formula governing $Gx_{MAX}$, $D_{EBT}$, and $D_{SBBT}$, where, $Gx_{MAX}$ represents magnitude of the selected maximum acceleration value before determination that operator braking action is imminent;

$D_{EBT}$ represents magnitude of longitudinal deceleration due to engine braking torque upon the determination that operator braking action is imminent;

$D_{SBBT}$ represents magnitude of magnitude of longitudinal deceleration due to stand-by braking torque applied upon the determination that operator braking action is imminent.

Figure 4:
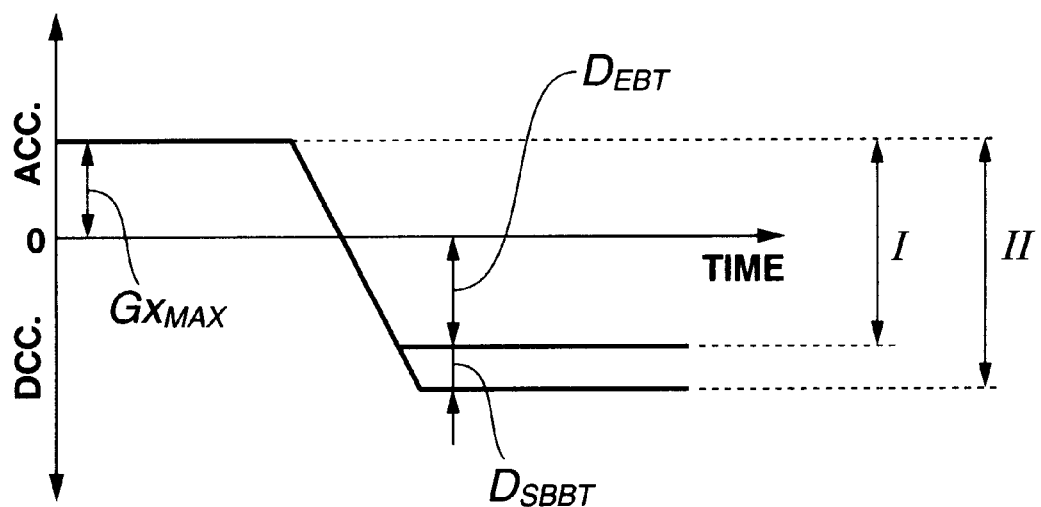
FIG. 4 is a timing diagram illustrating terms (I) and (II) of formula found by the inventors.

With reference to FIG. 4, the formula can be expressed as:

$$(Gx_{MAX}+D_{EBT}+D_{SBBT})/(Gx_{MAX}+D_{EBT})=II/I \leq \alpha \qquad (1),$$

where:

II represents the term $(Gx_{MAX}+D_{EBT}+D_{SBBT})$;

I represents the term $(Gx_{MAX}+D_{EBT})$; and

α is a value greater than 1 (one) and may take different values for different types of vehicles, respectively.

Formula (1) expresses condition under which addition of $D_{SBBT}$ will meet with much acceptance by vehicle operator even in situations that the operator would have negotiated without resorting to depression of brake pedal. In plain words, with $D_{SBBT}$ satisfying formula (1), it is likely that vehicle operator will not experience such additional deceleration due to application of stand-by braking torque as distinct from deceleration due to engine braking torque.

Figure 5:
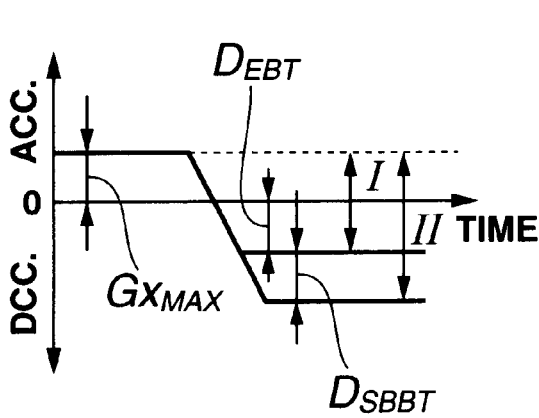
FIGS. 5 and 6 illustrating two different cases with the same vehicle speed, each case having terms (I) and (II) satisfying the formula.
Figure 6:
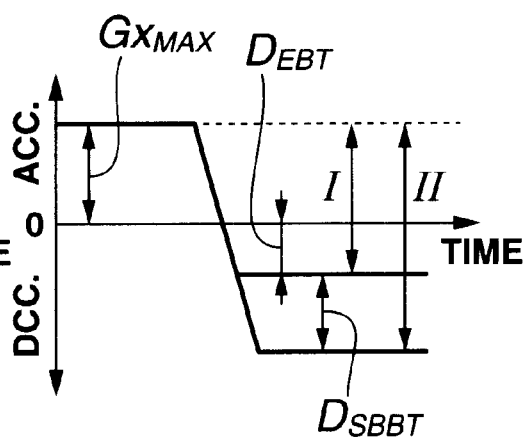

With reference to FIGS. 5 and 6, cases with different magnitudes of $Gx_{MAX}$ are considered. With the same vehicle speed, determination that operator braking action is imminent is made in each of the cases. Magnitude $D_{EBT}$ remains the same in each of the cases irrespective of variation in magnitude $Gx_{MAX}$. Hence, applying formula (1) in each of the cases will provide that magnitude $D_{SBBT}$ may be increased in proportional relationship to magnitude $Gx_{MAX}$.

The magnitude $Gx_{MAX}$ is greater in FIG. 6 than that in FIG. 5 so that the magnitude $D_{SBBT}$ in FIG. 6 is greater than that in FIG. 5.

Figure 7:
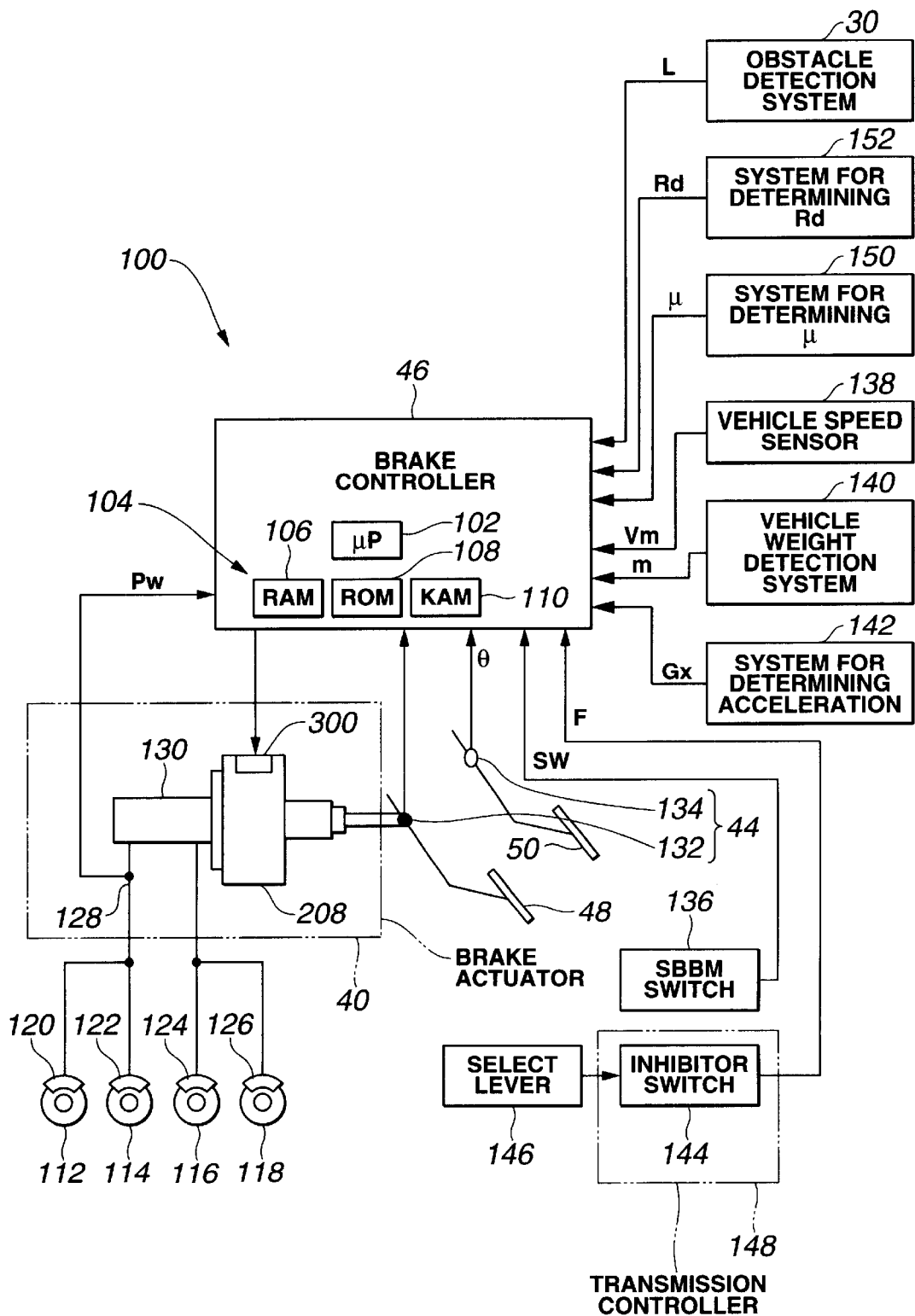
FIG. 7 is a block diagram illustrating a system and method for brake control, which provides stand-by braking torque applied to an automotive vehicle under a condition of approaching or following an obstacle preceding the vehicle.

Referring to FIG. 7, a block diagram illustrates an operation of a system or method for controlling stand-by braking torque applied to an automotive vehicle under a condition of approaching or following an obstacle preceding the vehicle. System 100 preferably includes a controller, such as brake controller 46. Brake controller 46 comprises a microprocessor-based controller associated with a microprocessor, represented by a reference numeral 102. Microprocessor 102 communicates with associated computer-readable storage medium 104. As will be appreciable by one of ordinary skill in the art, computer-readable storage medium 104 may include various devices for storing data representing instructions executable to control a braking system. For example, computer-readable storage medium 104 may include a random access memory (RAM) 106, a read-only memory (ROM) 108, and/or a keep-alive memory (KAM) 110. These functions may be carried out through any one of a number of known physical devices including EPROM, EEPROM, flash memory, and the like. The present invention is not limited to a particular type of computer-readable storage medium, examples of which are provided for convenience of description only.

Brake controller 46 also includes appropriate electronic circuitry, integrated circuits, and the like to effect control of the braking system. As such, controller 46 is used to effect control logic implemented in terms of software (instructions) and/or hardware components, depending upon the particular application. Details of control logic implemented by controller 46 are provided with reference to FIGS. 3, 9–11, and 16–17.

Controller 46 preferably receives inputs from brake actuator 40 indicative of present conditions of the brake actuator 40. For example, controller 46 may receive brake system pressure indicative of a pneumatic or hydraulic pressure for operating one or more braking devices, which may include any device that applies a negative torque to front wheels 112 and 114 and rear wheels 116 and 118. A braking device includes various types of friction brakes, such as disk brakes 120, 122, 124, and 126 or drum brakes. In the embodiment shown in FIG. 7, a pressure sensor 128 is provided to detect brake pressure Pw delivered to friction brakes 120 and 122 for front wheels 112 and 114. In the embodiment, a brake actuator 40 includes a master brake cylinder 130, with a brake booster 208, and a brake pedal 48. Pressure sensor 128 is located to detect brake pressure Pw within hydraulic fluid line interconnecting master brake cylinder 130 and friction brakes 120 and 122. Brake booster 208 in the embodiment is described later in connection with FIG. 8.

Controller 46 receives inputs from operator demand sensors 44, which include a brake switch 132 and an accelerator stroke (AC) sensor 134. The setting is such that brake switch 132 is turned off upon operator releasing brake pedal 48 or turned on upon operator depressing brake pedal 48. AC sensor 134 detects angle θ of accelerator pedal 50 through measurement of its stroke. Controller 46 receives angle θ and determines operator power demand expressed through accelerator pedal 50. In the embodiment, AC sensor 134 constitutes a component of a system for determining the magnitude or degree of operator power demand.

In the embodiment shown in FIG. 7, controller 46 receives input SW from a stand-by braking mode (SBBM) switch 136, which may be manually operated or automatically operated in view of circumstances around the vehicle 20. The setting is such that controller 46 performs operation in stand-by braking mode upon selection of the mode by SBBM switch 136.

Controller 46 receives environmental data from obstacle detection system 30. In the embodiment shown in FIG. 7, obstacle detection system 30 includes a radar sensor in the form of a conventional laser radar or a millimeter wave (MMW) radar sensor mounted in a forward section of vehicle 20. The conventional laser radar sensor comprises such known elements as laser diodes, transmission and receiver lenses, infrared filters, and photodiodes, as is generally understood in the art to which this invention pertains. MMW radar typically comprises such known elements as an antenna, down converter, video processor, FMCW modulator and associated electronics, as is generally understood in the art to which this invention pertains. The radar sensor propagates a signal along the path of vehicle 20 and collects reflections of the signal from an obstacle in or near the path. Obstacle detection system 30 further comprises an analog-to-digital converter of any suitable conventional type for converting the radar sensor output signal to a digital form for processing in microprocessor 102 to determine a distance L between vehicle 20 and an obstacle preceding the vehicle or a range to the obstacle.

Controller 46 receives input from a vehicle speed sensor 138. Vehicle speed sensor 138 is provided to measure or detect speed of rotation of the transmission output member. The vehicle speed sensor output signal is converted to a digital form by a suitable conventional analog-to-digital converter for processing in microprocessor 102 to determine vehicle speed Vm of vehicle 20. Most current vehicles are provided with a microprocessor-based controller, such as, an engine controller or an automatic transmission controller, which processes input from a vehicle speed sensor to determine vehicle speed Vm. In such case, controller 46 may receive the determined vehicle speed from such controller.

Controller 46 receives inputs from a vehicle weight detection system 140, which includes load sensors mounted to vehicle suspension system. Each of the load sensor output signals is converted to a digital form by a suitable conventional analog-to-digital converter for processing in microprocessor 102 to determine vehicle weight m of vehicle 20.

In the embodiment, controller 46 receives input from a system 142 for determining longitudinal acceleration, which vehicle 20 is subject to. Longitudinal acceleration determining system 142 may comprise an accelerometer. However, most current vehicles are not provided with accelerometers. In the embodiment, the system 142 comprises software operations in a microprocessor to determine the time rate change of vehicle speed Vm for use as longitudinal acceleration Gx. In the embodiment, the determined value of longitudinal acceleration Gx is used as DSI variable, which is determined at block 62 in FIG. 3.

In another embodiment of the present invention, the controller 46 receives input from AC sensor 134, and determines accelerator angle θ. The determined value of accelerator angle θ is used as DSI variable because it (θ) varies in a pattern similar to pattern of variation of longitudinal acceleration Gx.

In other embodiment of the present invention, controller 46 receives input from a conventional inhibitor switch 144 coupled to a select lever, as indicated at block 146, of the transmission of powering system 52. Select lever 146 has various positions including park "P", drive "D", neutral "N" and reverse "R". Inhibitor switch 144 generates outputs indicative of the various positions selectable by select lever 146. Most current vehicles are provided with microprocessor-based controllers for transmissions. Such controllers compute a speed ratio between rotational speed of an input shaft of a transmission and rotational speed of an output shaft of the transmission. Controller 46 communicates with a transmission controller, as indicated by a block 148, for the transmission of powering system 52 to receive a speed ratio F between transmission input and output shafts. Controller 46 determines or computes a product of (accelerator angle, θ) and (speed ratio, F) and uses the determined value of the product θ×F as DSI variable.

As environmental data, controller 46 uses the coefficient of friction ($\mu$) between the road surface and the tire of at least one wheel of vehicle 20 (road friction coefficient $\mu$) and the gradient (Rd) of the road surface (road gradient Rd). A system 150 for determining road friction coefficient $\mu$ uses sensor data to determine road friction coefficient $\mu$. Controller 46 may receive input from road friction coefficient determining system 150 or sensor data to determine road friction coefficient $\mu$. A system 152 for determining road gradient Rd uses sensor data to determine road gradient Rd. Controller 46 may receive input from road gradient determining system 152 or sensor data to determine road gradient Rd.

In the embodiments of the present invention, processor 102 of controller 46 effects processing input data to determine a target value of brake pressure to accomplish a target value of stand-by braking torque and applies a command to brake booster 208.

Figure 8:
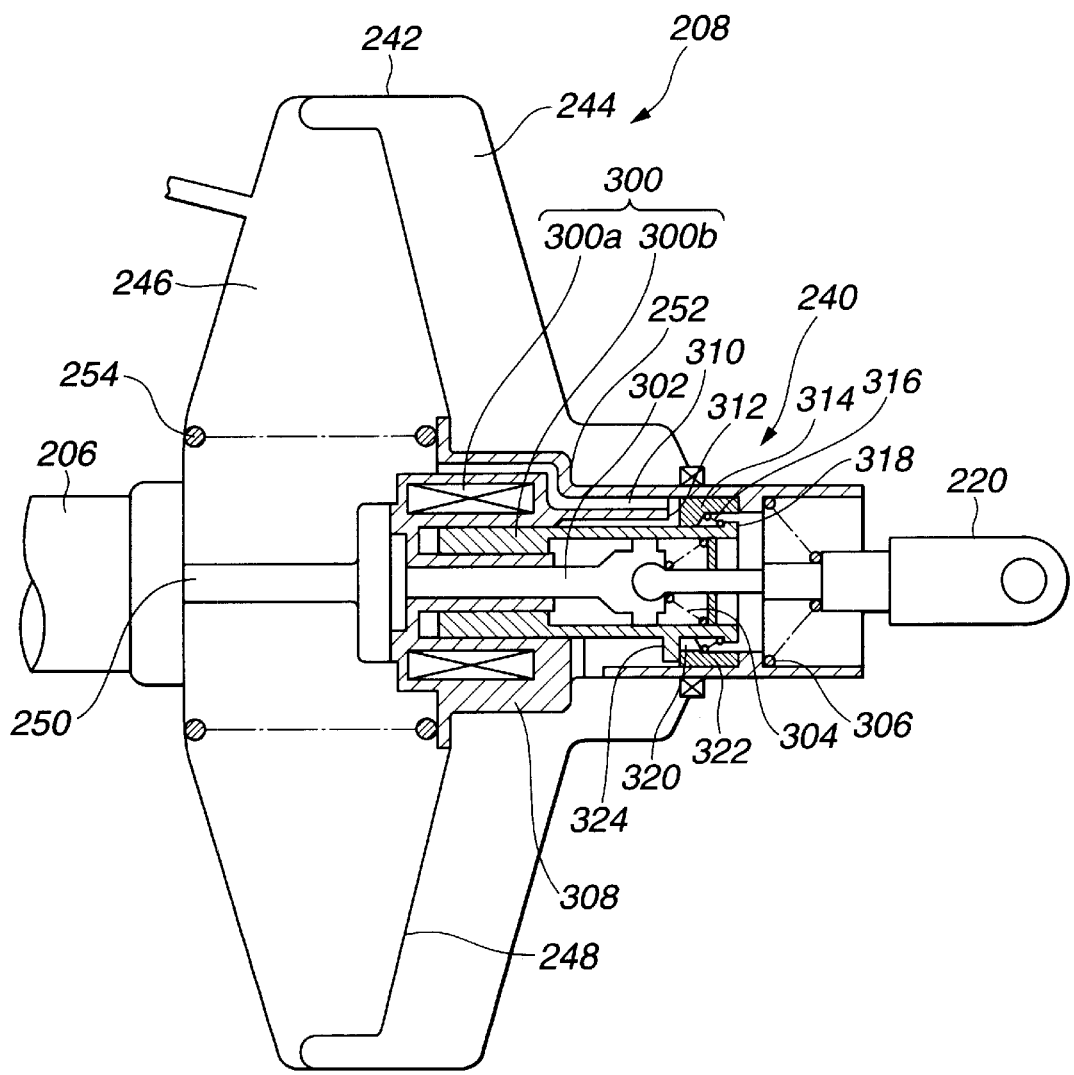
FIG. 8 is a schematic sectional view of a brake actuator.

Referring to FIG. 8, brake booster 208 includes an electro-magnetically operable control valve arrangement 240. Controller 46 provides braking command or signal to control valve arrangement 240 for adjustment of brake pressure to accomplish a target value of stand-by braking torque. Brake booster 208 comprises an essentially rotation symmetrical housing 242, in which a rear chamber 244 and a front chamber 246 are arranged and separated from each other by a movable wall 248. Control valve arrangement 240 is coupled with movable wall 248 for a common relative movement with respect to housing 242. The front end of rod-shaped actuation member 220, which is coupled with brake pedal 48, acts on control valve arrangement 240.

Within brake booster 208, a power output member 250 is arranged which bears against control valve arrangement 240. Power output member 250 is provided for activation of master brake cylinder 130.

Control valve arrangement 240 comprises an essentially tubular valve housing 252. The front end of valve housing 252 is coupled to movable wall 248. A return spring 254 arranged within brake booster 208 resiliently biases the control valve arrangement 240 rearwardly. Within valve housing 252, an electromagnetic actuator 300 is arranged which includes a solenoid coil 300a and a plunger 300b. Arranged within plunger 300b is an operating rod 302. The front end of operating rod 302 bears against power output member 250. A return spring 304 located within plunger 300b has one end bearing against a retainer (no numeral) fixedly connected to plunger 300b and opposite end bearing against the rear end of operating rod 302 The front ball end of rod-shaped actuator 220 is fixedly inserted into socket recessed inwardly from the rear end of operating rod 302. A return spring 306 located within valve housing 308 has one end bearing against a shoulder of valve housing 308 and opposite end bearing against a shoulder of rod-shaped actuator 220.

Valve housing 308 is formed with a passage 310 through which fluid communication between rear and front chambers 244 and 246 is established. The front end of passage 310 is always open to front chamber 246, while the rear end of passage 310 is located within a valve seat 312. Valve seat 312 is located within an annular space defined between plunger 300b and valve housing 308 and faces a valve member 314 that forms an upper portion of a slide. The slide is located between plunger 300b and valve housing 308. A return spring 316 has one end bearing against an integral abutment 318 of plunger 300b and opposite end bearing against the slide. An air admission port 320 is formed through a lower portion of the slide. This lower portion of the slide serves as a valve seat 322. Port 320 is provided to admit ambient air into rear chamber 244. Valve seat 322 formed with port 320 faces a valve member 324 integral with plunger 300b. Valve seat 312 and valve member 314 cooperate with each other to form an interruption or vacuum valve. Valve seat 322 and valve member 324 cooperate with each other to form an ambient air admission valve.

In the rest position shown in FIG. 8 with the vacuum source disconnected, atmospheric pressure prevails in both chambers 244 and 246. With the vacuum source connected, i.e., with the engine running, a vacuum builds up in front chamber 246 so that movable wall 248 together with the control valve arrangement 240 is slightly displaced in a forward direction. Accordingly, a new pressure balance is achieved between two chambers 244 and 246. From this position, a lost travel free activation of the brake booster 208 is ensured.

Under a normal brake actuation by the vehicle operator, the brake booster 208 operates in a usual manner by interrupting the connection between two chambers 244 and 246 via the interruption valve (312, 314) and admitting ambient air into rear chamber 244 via the ambient air admission valve (324, 322).

Electromagnetic actuator 300 can actuate control valve arrangement 240. For this purpose, current through solenoid 300a is regulated in response to the command furnished by brake controller 46. This command causes a displacement of control valve arrangement 240 so that ambient air can flow into rear chamber 244.

With reference to FIG. 7, a series of operations are stored in computer readable storage media 104 in the form of sequences of instructions implemented in software for determining DSI variable, sampling the determined values of DSI variable immediately before operator braking action is imminent, using the sampled values of DSI variable as a basis to establish a parameter, and using the established parameter as a basis to determine a target value of stand-by braking torque.

Figure 11:
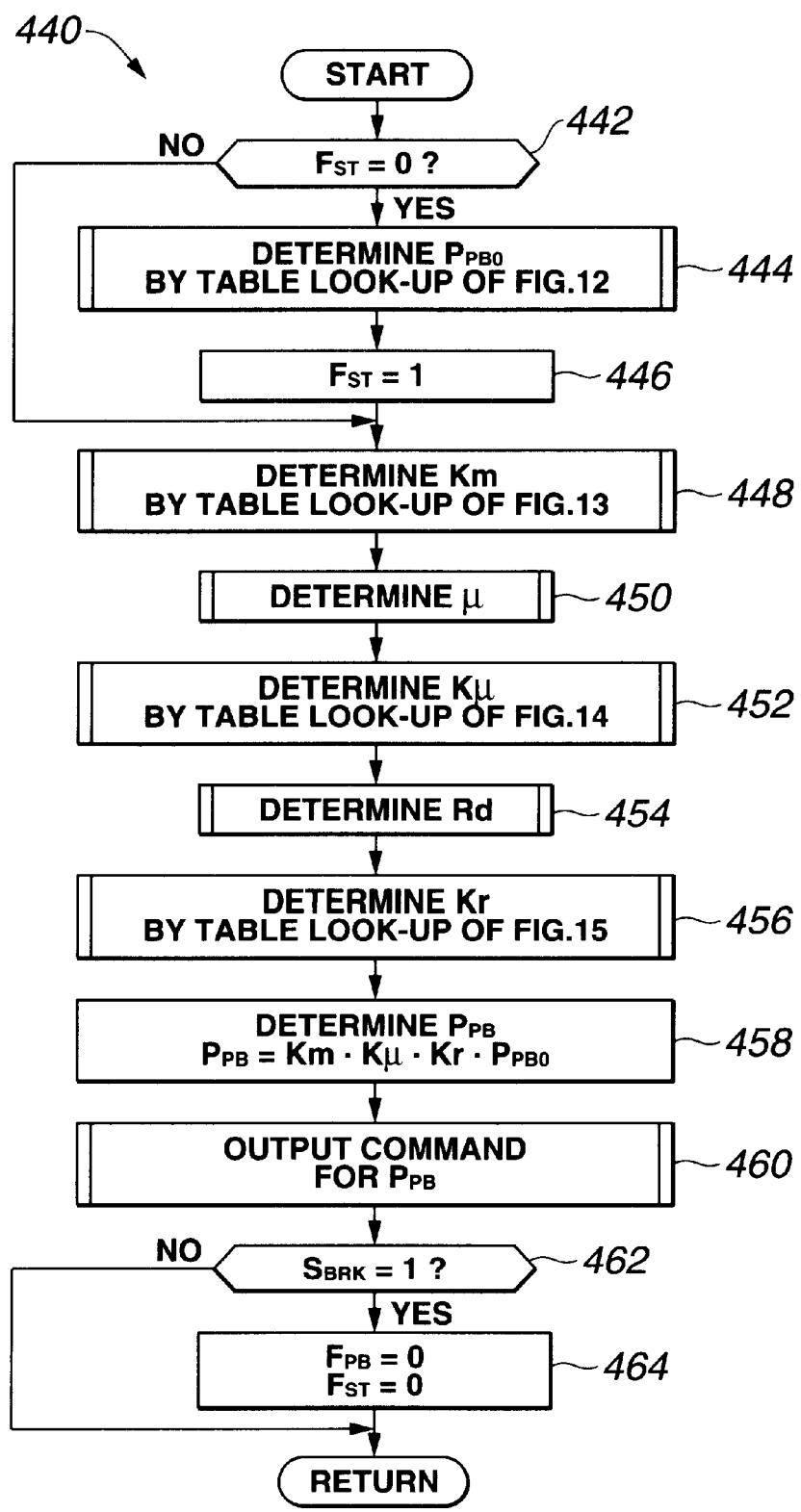
FIG. 11 is a flowchart illustrating a series of operations of a sub-routine for determining a target value of hydraulic brake pressure ($P_{PB}$) after correcting a base value of hydraulic brake pressure ($P_{PBO}$).

FIGS. 9, 10 and 11 illustrate a series of operations for carrying out a preferred embodiment of this invention. The process steps of FIGS. 9–11 are periodically executed in brake controller 46 when stand-by braking mode is selected by SMMB switch 136 (see FIG. 7) after the ignition has been on and electric power has been applied to controller 46.

In FIG. 9, a main control routine is generally indicated at 400. In FIG. 10, a sub-routine is generally indicated at 420. In FIG. 11, a sub-routine is generally indicated at 440.

The process steps of FIGS. 9–11 are carried out every ΔT (for example, 10 milliseconds) in controller 46 as provided through a standard computer timer-based interrupt process.

Each sequential execution of the microprocessor operations of FIG. 9 begins at "START" block and proceeds to process block 402. In block 402, the processor inputs or receives output signals from sensors, including pressure sensor 128, AC sensor 134 and vehicle speed sensor 138, from switches, including brake switch 132, SBBM switch 136, and from systems, including obstacle detection system 30, vehicle weight detection system 140, acceleration determining system 142, road friction coefficient (μ) determining system 150, and road gradient (Rd) determining system 152. The determined value of longitudinal acceleration Gx is stored as the newest one of a predetermined number of stored data after moving a sequence of the stored data to the right or left by overflowing the oldest one of the stored data. In the embodiment, the predetermined number of stored data is forty and the forty stored data are represented by $Gx_0$, $Gx_{-1}$, $Gx_{-2}$, . . . $Gx_{-39}$, respectively. $Gx_0$ represents the newest stored datum, and $Gx_{-39}$ represents the oldest stored datum. More specifically, the determined value Gx in the present operation cycle is stored as $Gx_0$. The forty stored data are processed in block 404. In block 404, the processor carries out a standard process of selecting or determining the maximum among the forty stored data $Gx_0$, $Gx_{-1}$, $Gx_{-2}$, . . . $Gx_{-39}$ to update a maximum longitudinal acceleration $Gx_{MAX}$. Processing at block 404 provides the maximum $Gx_{MAX}$ among forty sampled determined values of longitudinal acceleration, which have been sampled over a period of time of 400 milliseconds that ends with beginning of each sequential execution of the microprocessor operations.

After updating $Gx_{MAX}$, determined values of vehicle speed Vm and distance L are next processed at block 406. At process block 406, the processor calculates the time rate of change in distance dL/dt (relative speed between vehicle and the preceding obstacle) and a threshold distance $L_0$, which is expressed as:

$$L_0 = \{Vm^2 - (Vm - dL/dt)^2\}/2G_D \quad (2),$$

where:

Vm represents the determined value of vehicle speed;

L represents the determined value of distance between vehicle and an obstacle preceding the vehicle; and $G_D$ represents a predetermined absolute value of vehicle longitudinal deceleration, this predetermined absolute value being less than the maximum of absolute values of vehicle longitudinal deceleration, which may be induced by operator braking action for emergency braking, but being as great as absolute value of vehicle longitudinal deceleration, which may be induced by operator braking action for normal braking.

The process then proceeds to block 408. In block 408, distance L and threshold $L_0$ are compared. In this query, if L is less than or equal to $L_0$ (answer "YES"), the process proceeds to block 410 and execution of sub-routine 420 (see FIG. 10) begins. In the query at block 408, if L is greater than $L_0$ (answer "NO"), the process proceeds to block 412, and processes are carried out to stop command from controller 46 to release brake booster 208. After block 412, the process skips to "RETURN" block. In the embodiment, the query at block 408 is utilized as an analysis to determine whether there is a need for operator braking action to avoid a potential problem to the vehicle posed by an obstacle preceding the vehicle. If the analysis at block 408 concludes that the obstacle preceding the vehicle poses a potential problem to the vehicle, the process advances to block 410 to proceed to blocks 422–438 of sub-routine 420 in FIG. 10 where further analysis is commenced.

Referring to FIG. 10, microprocessor operations at blocks 422–438 are carried out to determine whether operator braking action is imminent to avoid the potential problem. This further analysis utilizes accelerator angle θ as operator power demand information. Alternatively, in the place of accelerator angle θ, a throttle position or a pulse width of fuel injection pulse may be utilized. In block 422, a stand-by braking in-progress flag $F_{PB}$ is checked. In query at block 422, if flag $F_{PB}$ is cleared or reset (answer "YES"), the process moves to block 424, and an accelerator wide-open flag $F_{OP}$ is checked. In query at block 422, if flag $F_{PB}$ is set (answer "NO"), the process moves to block 426, and accelerator angle θ and a predetermined accelerator open threshold angle $θ_{OP}$ are compared.

In query at block 424, if flag $F_{OP}$ is cleared or reset (answer "YES"), the process proceeds to block 428, and accelerator angle θ and threshold angle $θ_{OP}$ are compared. In query at block 424, if flag $F_{OP}$ is set (answer "NO"), the process skips to block 432.

In query at block 428, if accelerator angle θ is greater than or equal to threshold angle $θ_{OP}$ (answer "YES"), the process proceeds to block 430, and flag $F_{OP}$ is set. Next, the process proceeds to block 432. In query at block 428, if accelerator angle θ is less than $θ_{OP}$ (answer "NO"), the process skips to block 432.

In block 432, flag $F_{OP}$ is checked. In query at block 432, if flag $F_{OP}$ is set (answer "YES"), the process proceeds to block 434, and accelerator angle θ and an accelerator close threshold angle $θ_{OFF}$ are compared. Threshold angle $θ_{OFF}$ is less than $θ_{OP}$. In query at block 432, if flag $F_{OP}$ is cleared or reset (answer "NO"), the process skips to block 414 of main routine 400 in FIG. 9.

In query at block 434, if accelerator angle θ is less than or equal to $θ_{OFF}$ (answer "YES"), the process proceeds to block 436, and flag $F_{PB}$ is set and flag $F_{OP}$ is cleared or reset. Then, the process skips to block 414 in FIG. 9. In query at block 434, if accelerator angle θ is greater than $θ_{OFF}$ (answer "NO"), the process skips to block 414 of main routine 400 in FIG. 9.

In query at block 426, if accelerator angle θ is less than or equal to $θ_{OP}$ (answer "YES"), the process skips to block 414 of main routine 400 in FIG. 9. In query at block 426, if accelerator angle θ is greater than $θ_{OP}$ (answer "NO"), the process proceeds to block 438, and flag $F_{PB}$ is cleared or reset. Then, the process skips to block 414 of main routine 400 in FIG. 9. As is readily understood by those skilled in the art to which this invention pertains, flag $F_{PB}$ is set upon determination that operator braking action is imminent (flow along blocks 422-424-432-434-436), and subsequently cleared or reset upon determination that accelerator angle θ has exceeded threshold angle $θ_{OP}$ (flow along blocks 422-426-438).

From the preceding description, it is now understood that, in the embodiment, the process determines that operator braking action is imminent upon a reduction of accelerator angle θ from $θ_{OP}$ to $θ_{OFF}$ (flow along blocks 423-430-432-434-436) under a condition that $L \leq L_O$ (flow along blocks 408–410).

Turning back to FIG. 9, at process block 414, flag $F_{PB}$ is checked. In query at block 414, if flag $F_{PB}$ is set (answer "YES"), the process proceeds to block 416, and microprocessor operations at blocks 442–464 of sub-routine 440 (FIG. 11) are carried out. In query at block 414, if flag $F_{PB}$ is cleared or reset (answer "NO"), the process proceeds to block 412, and processes to stop command are carried out. After block 416 or 412, the process skips to "RETURN" block.

Referring to FIG. 11, microprocessor operations at blocks 442–464 are carried out to determine a target value $P_{PB}$ of brake pressure based on a parameter in the form of maximum longitudinal acceleration $Gx_{MAX}$. The parameter $Gx_{MAX}$ has been established based on forty stored data $Gx_0$, $Gx_{-1}$, $Gx_{-2}$, . . . $Gx_{-39}$. These data were sampled over a period of time of 400 milliseconds that ends with an operation cycle where determination that operator braking action is imminent is first made. More specifically, at block 442, a stand-by braking start-up flag $F_{ST}$ is checked. Flag $F_{ST}$ is set after execution of the initial operation cycle of sub-routine 440. In query at block 442, if flag $F_{ST}$ is cleared or reset (answer "YES"), the process proceeds to block 444 and a base value $P_{PBO}$ of brake pressure is determined against $Gx_{MAX}$ and vehicle speed Vm. The process then moves to block 446 and flag $F_{ST}$ is set. The process proceeds next to block 448. In query at block 442, if flag $F_{ST}$ has been set (answer "NO"), the process skips to block 448. As flag $F_{ST}$ is initially reset, but it is set afterwards after determination of $P_{PBO}$ at block 444, the process skips from block 442 to block 448 during each of the subsequent operation cycles of sub-routine 440. The base value $P_{PBO}$ determined at block 444 remains unaltered during the subsequent operation cycles.

Figure 12:
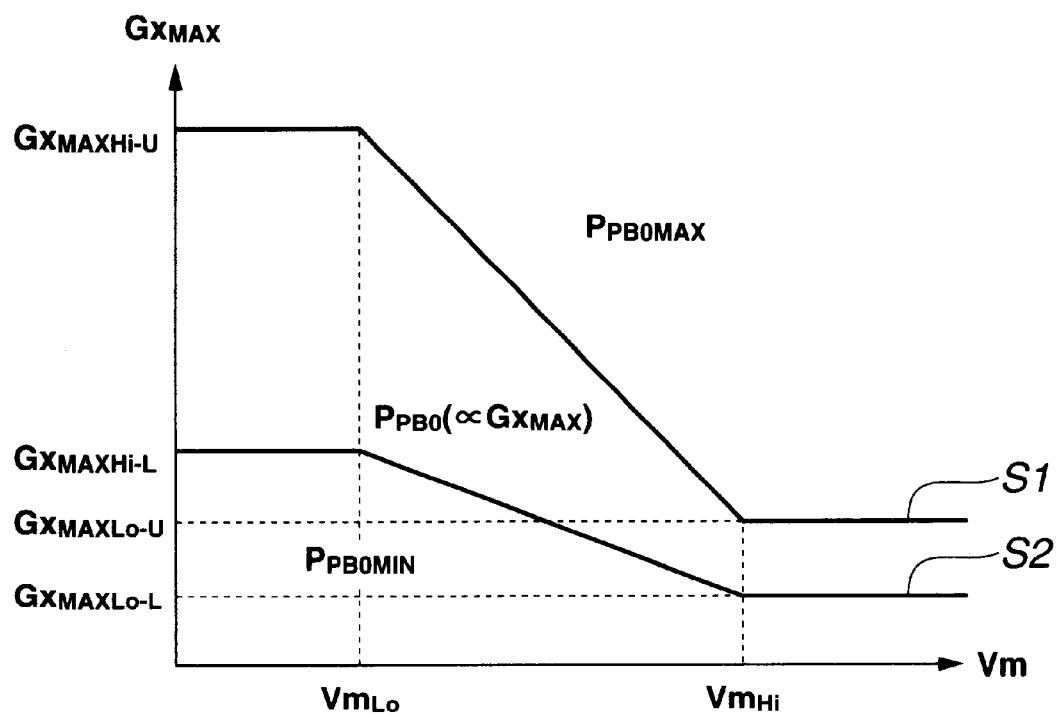
FIG. 12 is a graph depicting a filter having various ranges of values of a parameter in the form of maximum longitudinal acceleration ($Gx_{MAX}$) against various values of vehicle speed (Vm).

With reference to FIG. 12, description is made on how to determine, at block 444 in the embodiment, an appropriate base value $P_{PBO}$ using parameter $Gx_{MAX}$ and vehicle speed Vm. FIG. 12 is a graph depicting a filter having various ranges of values of a parameter in the form of maximum longitudinal acceleration $Gx_{MAX}$ against various values of vehicle speed Vm. Lines S1 and S2 illustrate variations of upper and lower extreme values of the ranges of the filter. As indicated by lines S1 and S2, upper and lower extreme values remain as high as $Gx_{MAX\ Hi-U}$ and $Gx_{MAX\ Hi-L}$, respectively, against various values of vehicle speed Vm lower than or equal to $Vm_{Lo}$, while they remain as high as $Gx_{MAX\ Lo-U}$ and $Gx_{MAX\ Lo-L}$, respectively, against various values of vehicle speed Vm higher than or equal to $Vm_{Hi}$. Against intermediate values of vehicle speed Vm between $Vm_{Lo}$ and $Vm_{Hi}$, the lines S1 and S2 have ramp-like sections, respectively. The ramp-like section of line S1 interconnects a level as high as $Gx_{MAX\ Hi-U}$ and a level as high as $Gx_{MAX\ Lo-U}$. The ramp-like section line S2 interconnects a level as high as $Gx_{MAX\ Hi-L}$ and a level as high as $Gx_{MAX\ Lo-L}$. The relationship is such that $Vm_{Hi} > Vm_{Lo}$. The relationship is such that $$Gx_{MAX\ Hi-U} > Gx_{MAX\ Hi-L} > Gx_{MAX\ Lo-U} > Gx_{MAX\ Lo-L},$$

and $$(Gx_{MAX\ Hi-U} - Gx_{MAX\ Hi-L}) > (Gx_{MAX\ Lo-U} - Gx_{MAX\ Lo-L}).$$

As is readily seen from FIG. 12, the filter has a wide range, which covers relatively large values of parameter $Gx_{MAX}$, when Vm is less than or equal to $Vm_{Lo}$, while it has a narrow range, which covers relatively small values of parameter $Gx_{MAX}$, when Vm is greater than or equal to $Vm_{Hi}$. As Vm increases from $Vm_{Lo}$ to ward $Vm_{Hi}$, the range of filter gradually becomes narrow and the coverage by the filter range shifts.

If a determined value of parameter $Gx_{MAX}$ is greater than an upper extreme value, i. e., a point on line S1, selected against a determined value of vehicle speed Vm, a maximum base value $P_{PBO\ MAX}$ is set as base value $P_{PBO}$. If a determined value of parameter $Gx_{MAX}$ is less than a lower extreme value, i.e., a point on line S2, selected against a determined value of vehicle speed Vm, a minimum base value $P_{PBO\ MIN}$ is set as base value $P_{PBO}$. In the embodiment, the setting is such that the maximum base value $P_{PBO\ MAX}$ is 0.5 MPa and the minimum base value $P_{PBO\ MIN}$ is 0.1 MPa.

Let us consider the case where a determined value of parameter $Gx_{MAX}$ is less than or equal to an upper extreme value, i.e., a point on line S1, selected against a determined value of vehicle speed Vm, but greater than or equal to a lower extreme value, i.e., a point on line S2, selected against the determined value of vehicle speed Vm. In this case, the base value $P_{PBO}$ is determined by calculating the equation as follows:

$$P_{PBO} = (P_{PB\ MAX} - P_{PB\ MIN}) \times (Gx_{MAX}^* - Gx_{MAX-L}) \div (Gx_{MAX\ U} - Gx_{MAX-L}) + P_{PB\ MIN} \qquad (3),$$

where:

$Gx_{MAX-U}$ is a general representation of an upper extreme value of a range of the filter selected against a determined value of vehicle speed Vm;

$Gx_{MAX-L}$ is a general expression of a lower extreme value of the range; and $Gx_{MAX}^*$ represents a determined value of parameter in the form of maximum longitudinal acceleration that falls in the range having the upper and lower extreme values $Gx_{MAX-U}$ and $Gx_{MAX-L}$.

In a stored look-up table in computer readable storage medium 104, upper and lower extreme values $Gx_{MAX-U}$ and $Gx_{MAX-L}$ are arranged or allocated against various values of vehicle speed Vm in a manner as illustrated by the upper and lower threshold lines S1 and S2 illustrated in FIG. 12. In the embodiment, this look-up table is used for microprocessor operations at block 444 in FIG. 11.

Referring back to FIG. 11, at block 444, the processor determines base value $P_{PBO}$ of brake pressure through microprocessor operations, which include:

1) Performing a table look-up operation of the above-mentioned look-up table using a determined value of vehicle speed Vm to find or determine upper and lower extreme values $Gx_{MAX-U}$ and $Gx_{MAX-L}$ of a range appropriate to the determined value of vehicle speed Vm;

2) Comparing a determined maximum longitudinal acceleration $Gx_{MAX}$ to the determined upper and lower extreme values $Gx_{MAX-U}$ and $Gx_{MAX-L}$;

3) In the case (A) where $Gx_{MAX-U} \geq Gx_{MAX} \geq Gx_{MAX-L}$, determining base value $P_{PBO}$ by calculating the equation (3);

4) In the case (B) where $Gx_{MAX} < Gx_{MAX-L}$, setting that $P_{PBO} = P_{PBO\ MIN}$; and 5) In the case (C) where $Gx_{MAX} > Gx_{MAX-U}$, setting that $P_{PBO} = P_{PBO\ MAX}$.

After microprocessor operations at block 444, the process advances to block 446 and then to block 448. At block 448, an appropriate value of vehicle weight gain Km is determined against a determined value of vehicle weight m by using a look-up table as illustrated by the fully drawn line in FIG. 13. The value of vehicle weight m is obtained at block 402 (see FIG. 9). Further description on this look-up table is made later with reference to FIG. 13. The process then moves to block 450.

At block 450, the processor determines a current value of road surface friction coefficient $\mu$. Information on longitudinal acceleration Gx or lateral acceleration, which the vehicle is subject to, may be used for microprocessor operations to estimate or calculate road friction coefficient $\mu$. The process then goes to block 452. At block 452, an appropriate value of road surface friction coefficient gain K$\mu$ is determined against the determined value of road friction coefficient $\mu$ by using a look-up table as illustrated by the fully drawn line in FIG. 14. Further description on this look-up table is made later with reference to FIG. 14. The process then moves to block 454.

At block 454, the processor determines a current value of road gradient Rd. Information from sensor data may be used for microprocessor operations to estimate or calculate road gradient Rd. The process moves next to block 456. At block 456, an appropriate value of road gradient gain Kr against the determined value of road gradient Rd by using a look-up table as illustrated by the fully drawn line in FIG. 15. Further description on this look-up table is made later with reference to FIG. 15. The process then moves to block 458.

At block 458, the processor determines a target value of brake pressure $P_{PB}$ to accomplish a target value of stand-by braking torque by calculating an equation as follows:

$$P_{PB} = Km \times K\mu \times Kr \times P_{PBO} \qquad (4),$$

where:

a product ($Km \times K\mu \times Kr$) represents a combined gain.

The process moves to next block 460. At block 460, the processor determines a command for accomplishing target value $P_{PB}$ and issues the command toward electromagnetic actuator 300 of brake booster 208 (see FIG. 7). Then, the process proceeds to block 462, and a brake switch output $S_{BRK}$ from brake switch 132 is checked. In query at block 462, if brake switch output $S_{BRK}$ is equal to "1" (answer "YES"), the process goes to block 464. In query at block 462, if brake switch output $S_{BRK}$ is "0" (answer "NO"), the process skips to "RETURN" block of main routine 400 (see FIG. 9). At block 464, both flags $F_{PB}$ and $F_{ST}$ are cleared. The process returns to "RETURN" block of main routine 400. The relationship between brake switch output $S_{BRK}$ and brake switch 132 is such that if brake pedal 48 is depressed, brake switch 132 is turned on and brake switch output $S_{BRK}$ is equal to "1", and if brake pedal 48 is not depressed, brake switch 132 is turned off and brake switch output $S_{BRK}$ is equal to "0".

Figure 13:
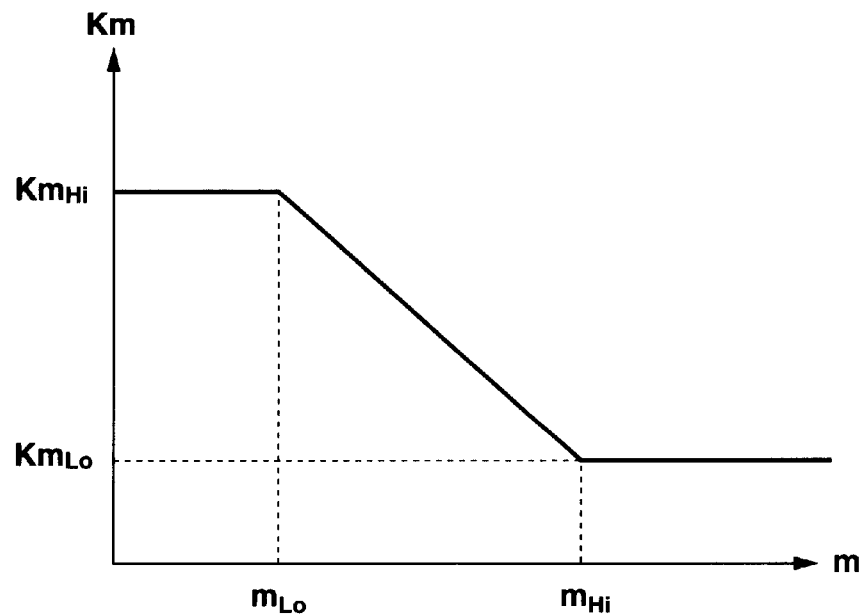
FIG. 13 is a graph depicting various positive values of a vehicle weight gain (Km) against various values of vehicle weight (m).

With reference to FIG. 13, the fully drawn line illustrates variation of vehicle weight gain Km. The vertical axis represents various values of vehicle weight gain Km and the horizontal axis represents various values of vehicle weight m. A range of values, which Km may take, has an upper extreme value $Km_{Hi}$, a lower extreme value $Km_{Lo}$, and intermediate values. In the embodiment, the upper extreme value $Km_{Hi}$ is 1.0, and the lower extreme value $Km_{Lo}$ is 0.1. The illustrated fully drawn line remains as high as upper extreme value $Km_{Hi}$ against various values of vehicle weight Vm lower than or equal to a predetermined low vehicle weight value $m_{Lo}$, while it remains as high as lower extreme value $Km_{Lo}$ against various values of Vm higher than or equal to a predetermined high vehicle weight value $m_{Hi}$. Against intermediate values between $m_{Lo}$ and $m_{Hi}$, the fully drawn line has a ramp-like section. This ramp-like section interconnects a level as high as $Km_{Hi}$ and a level as high as $Km_{Lo}$. As clearly indicated by the ramp-like section of the fully drawn line, the intermediate values of Km have a linear inverse proportional relationship with the intermediate values m between $m_{Lo}$ and $m_{Hi}$. It is now appreciated that vehicle weight gain Km decreases as vehicle weight m increases to reflect a deceleration performance characteristic that the magnitude of deceleration, induced due to application of a braking torque, decreases as vehicle weight m increases. As indicated in equation (4), multiplying gain Km with base value $P_{PBO}$ results in incorporating this characteristic into target value $P_{PB}$.

Figure 14:
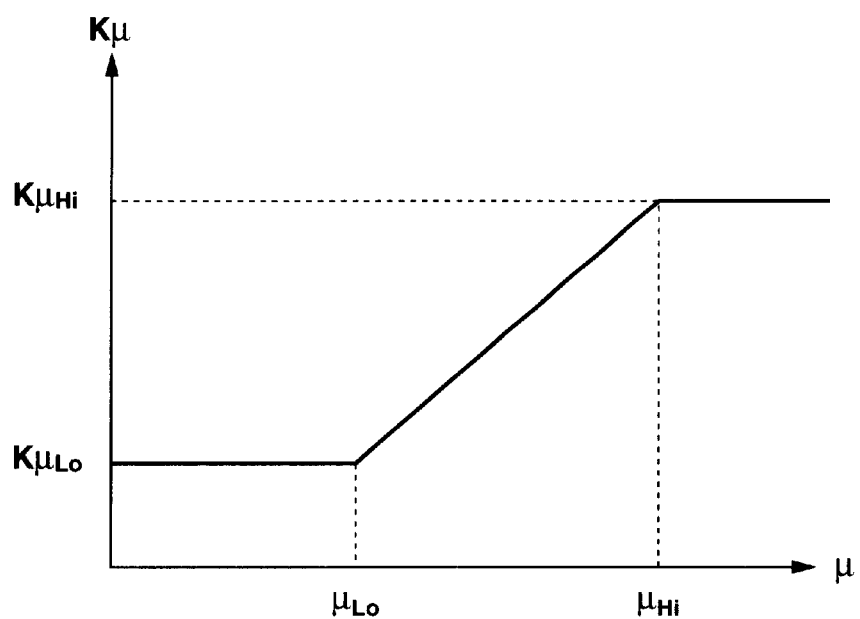
FIG. 14 is a graph depicting various positive values of a road surface friction correction coefficient gain ($K\mu$) against various values of road surface friction coefficient ($\mu$), i.e., coefficient of friction between the road surface and the tire of at least one wheel of the automotive vehicle.

With reference to FIG. 14, the fully drawn line illustrates variation of road surface friction coefficient gain $K\mu$. The vertical axis represents various values of gain $K\mu$ and the horizontal axis represents various values of road surface friction coefficient $\mu$. A range of values, which $K\mu$ may take, has an upper extreme value $K\mu_{Hi}$, a lower extreme value $K\mu_{Lo}$, and intermediate values. In the embodiment, the upper extreme value $K\mu_{Hi}$ is 1.0, and the lower extreme value $K\mu_{Lo}$ is 0.1. The illustrated fully drawn line remains as high as lower extreme value $K\mu_{Lo}$ against various values of road surface friction coefficient $\mu$ lower than or equal to a predetermined low road friction coefficient value $\mu_{Lo}$, while it remains as high as upper extreme value $K\mu_{Hi}$ against various values of $\mu$ higher than or equal to a predetermined high road friction coefficient value $\mu_{Hi}$. Against intermediate values between $\mu_{Lo}$ and $\mu_{Hi}$, the fully drawn line has a ramp-like section. This ramp-like section interconnects a level as high as $K\mu_{Lo}$ and a level as high as $K\mu_{Hi}$. As clearly indicated by the ramp-like section of the fully drawn line, the intermediate values of $K\mu$ have a linear proportional relationship with the intermediate values of $\mu$ between $\mu_{Lo}$ and $\mu_{Hi}$. It is now appreciated that gain $K\mu$ decreases as road surface friction coefficient $\mu$ decreases to reflect a deceleration characteristic that the magnitude of deceleration, induced due to application of a braking torque, decreases as road surface friction coefficient $\mu$ decreases. As indicated in equation (4), multiplying the gain $K\mu$ with base value $P_{PBO}$ results in incorporating this characteristic into target value $P_{PB}$.

Figure 15:
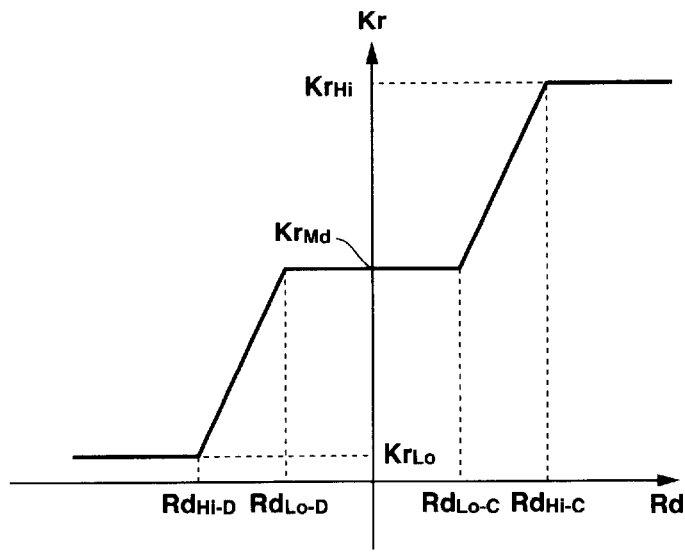
FIG. 15 is a graph depicting various positive values of a road gradient gain (Kr) against various values of road gradient (Rd).

With reference to FIG. 15, the fully drawn line illustrates variation of road gradient gain Kr. The vertical axis represents various values of gain Kr and the horizontal axis represents various values of road gradient Rd. A range of values, which Kr may take, has an upper extreme value $Kr_{Hi}$, a lower extreme value $Kr_{Lo}$, and intermediate values. The intermediate values include a middle value $Kr_{Md}$. In the embodiment, the upper extreme value $Kr_{Hi}$ is 1.0 and the lower extreme value $Kr_{Lo}$ is 0.1. Road gradient Rd takes a positive value if road is ascending, but takes a negative value if road is descending. In the case where ascending is low in degree, positive values of road gradient Rd are less than or equal to a predetermined low ascending range boundary value $Rd_{Lo-C}$. In the case where descending is low in degree, negative values of road gradient Rd are greater than or equal to a predetermined low descending range boundary value $Rd_{Lo-D}$. In the case where ascending is high in degree, positive values of road gradient Rd are greater than or equal to a predetermined high ascending range boundary value $Rd_{Hi-C}$. In the case where descending is high in degree, negative values of road gradient Rd are less than or equal to a predetermined high descending range boundary value $Rd_{Hi-D}$. The illustrated fully drawn line remains as high as low extreme value $Kr_{Lo}$ against varying negative values of road gradient Rd less than or equal to $Rd_{Hi-D}$, while it remains as high as high extreme value $Kr_{Hi}$ against varying positive values of road gradient Rd greater than or equal to $Rd_{Hi-C}$. Against various values of road gradient Rd, which are greater than or equal to $Rd_{Lo-D}$ but less than or equal to $Rd_{Lo-C}$, the fully drawn line remains as high as middle value $Kr_{Md}$. Against intermediate positive values between $Rd_{Lo-C}$ and $Rd_{Hi-C}$, the fully drawn line has a first ramp-like section. This ramp-like section interconnects a level as high as $Kr_{Md}$ and a level as high as $Kr_{Hi}$. As clearly indicated by the first ramp-like section, the intermediate values of Kr between $Kr_{Md}$ and $Kr_{Hi}$ have a linear proportional relationship with the intermediate positive values of Rd between $Rd_{Lo-C}$ and $Rd_{Hi-C}$. Against intermediate negative values between $Rd_{Lo-D}$ and $Rd_{Hi-D}$, the fully drawn line has a second ramp-like section. This second ramp-like section interconnects a level as high as $Kr_{Md}$ and a level as high as $Kr_{Lo}$. As clearly indicated by the second ramp-like section, the intermediate values of Kr between $Kr_{Md}$ and $Kr_{Lo}$ have a linear proportional relationship with the intermediate negative values between $Rd_{Lo-D}$ and $Rd_{Hi-D}$. It is now appreciated that gain Kr increases as road gradient Rd increases in ascending road to reflect a deceleration characteristic that the magnitude of deceleration, induced due to application of a braking torque, increases in ascending road as road gradient Rd increases. Gain Kr decreases as the absolute value of road gradient Rd increases in descending road to reflect a deceleration characteristic that the magnitude of deceleration, induced due to application of a braking torque, decreases in descending road as the absolute value of road gradient Rd increases. As indicated in equation (4), multiplying the gain Kr with base value $P_{PBO}$ results in incorporating these characteristics into target value $P_{PB}$.

From the preceding description of the embodiment particularly with reference to FIGS. 4–6 and 12, it is now appreciated that the base value $P_{PBO}$ takes intermediate values between the minimum and maximum base values $P_{PBO\ MIN}$ and $P_{PBO\ MAX}$. The intermediate values have a linear proportional relationship with values of parameter $Gx_{MAX}^*$ that fall in a range of the filter having upper and lower extreme values $Gx_{MAX-U}$ and $Gx_{MAX-L}$. The upper and lower extreme values $Gx_{MAX-U}$ and $Gx_{MAX-L}$ are variable with variation of vehicle speed Vm.

In the embodiment just described, the parameter is in the form of maximum longitudinal acceleration $Gx_{MAX}$ and it is used as a basis to determine a target value $P_{PB}$ of brake pressure.

Figure 17:
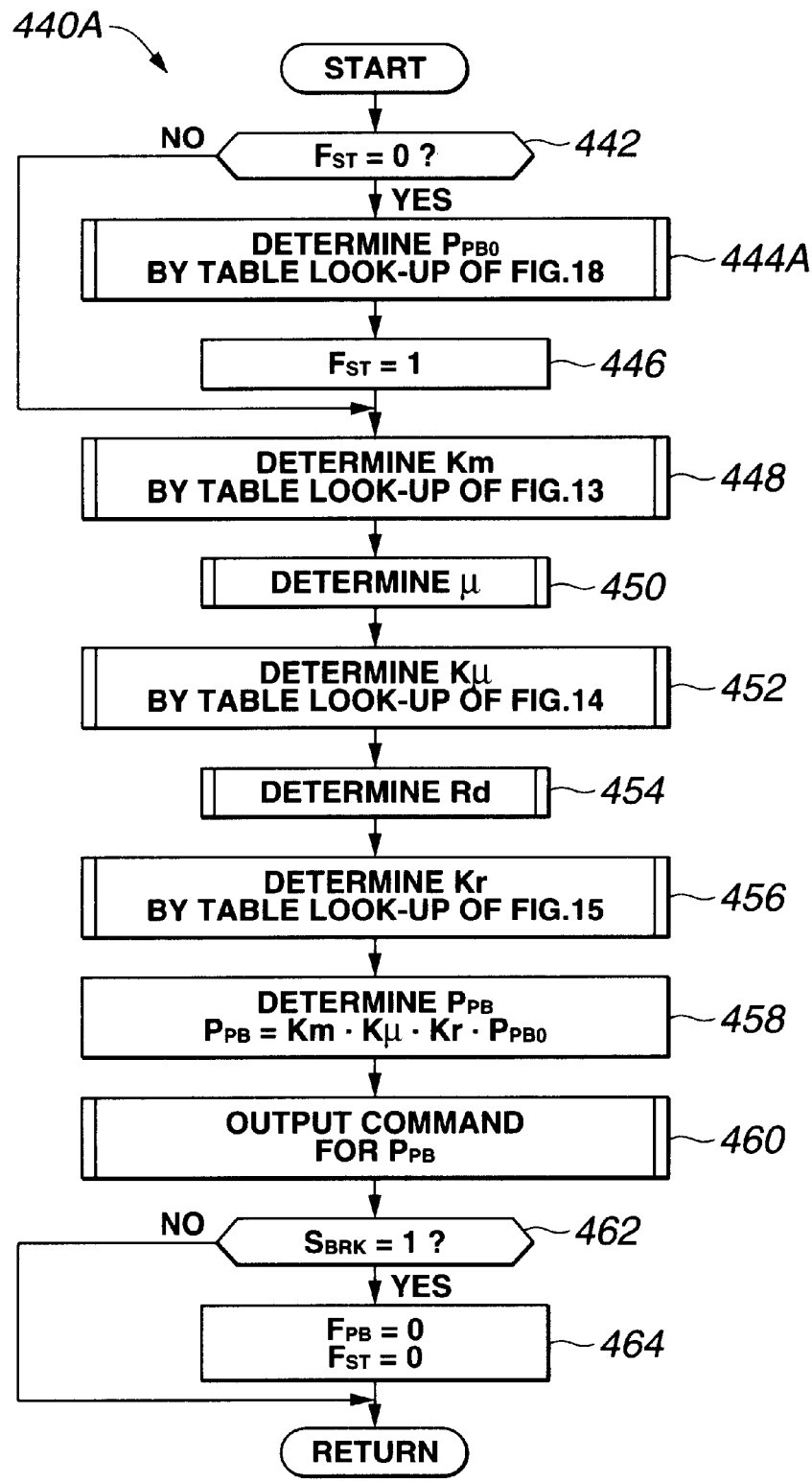
FIG. 17 is a flowchart illustrating a series of operations of a sub-routine for determining a target value of brake pressure ($P_{PB}$) after correcting a base value of brake pressure ($P_{PBO}$).
Figure 18:
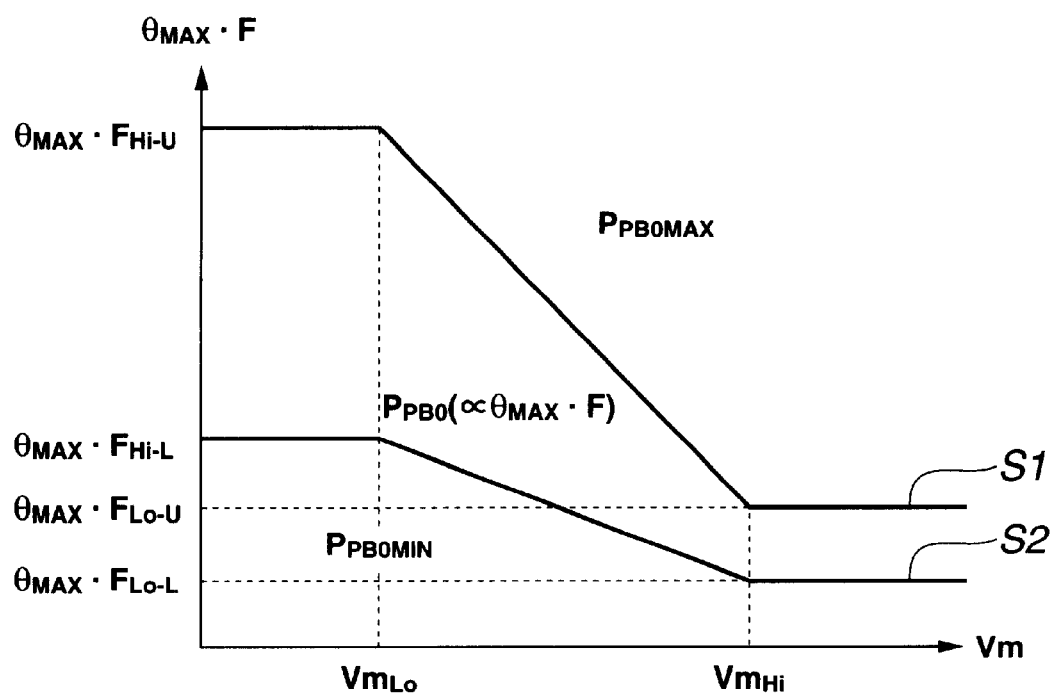
FIG. 18 is a graph depicting a filter having various ranges of values of a parameter in the form of product of maximum accelerator angle and speed ratio (F) against various values of vehicle speed (Vm).

With reference to FIGS. 17–18, in another preferred embodiment, the processor utilizes accelerator angle θ instead of longitudinal acceleration Gx to establish a maximum accelerator angle $θ_{MAX}$. The processor calculates a product $θ_{MAX}×F$ (F is a speed ratio between input shaft and an output shaft of transmission). This product $θ_{MAX}×F$ is used as a parameter instead of $Gx_{MAX}$ in determining a base value $P_{PBO}$ of hydraulic brake pressure by referring to FIG. 18. FIG. 18 is analogous to FIG. 12. The product $θ_{MAX}×F$ exhibits a reasonably good approximation to maximum longitudinal acceleration $Gx_{MAX}$ in determining $P_{PBO}$.

This embodiment is substantially the same as the embodiment described particularly with reference to FIGS. 7–15 except the use of information to determine speed ratio F, main routine 400A (see FIG. 16), sub-routine 440A (see FIG. 17), and a look-up table as illustrated in FIG. 18.

Figure 16:
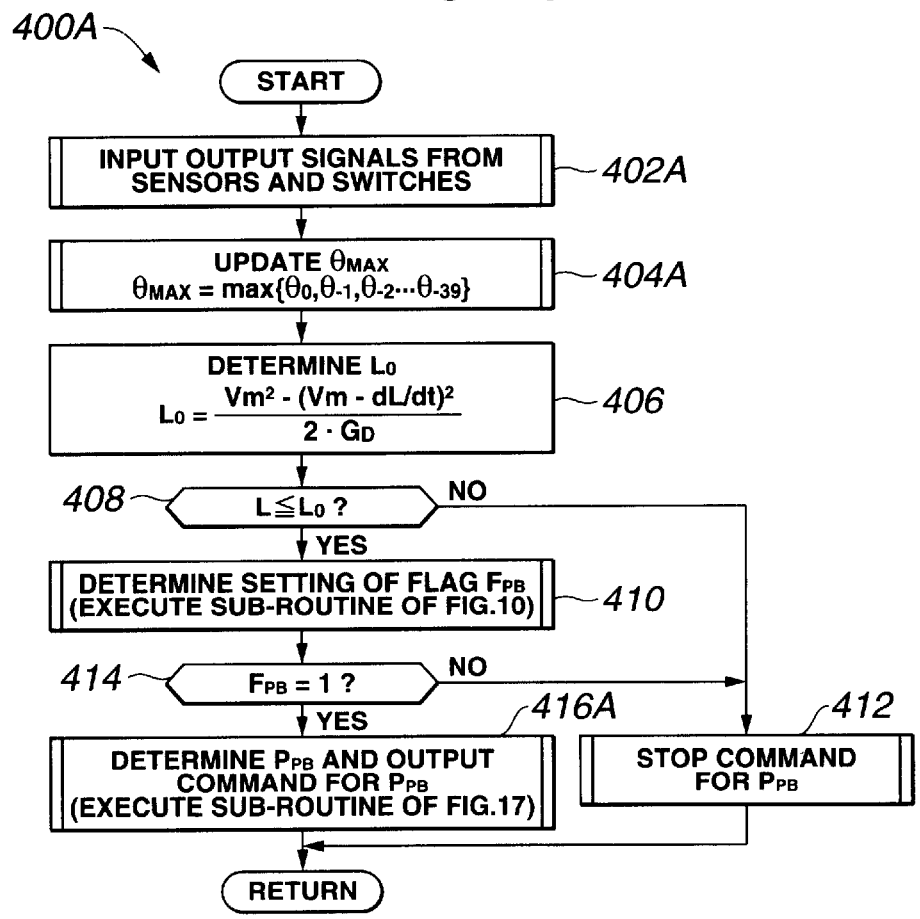
FIG. 16 is a flowchart, similar to FIG. 9, illustrating a series of operations of a main routine for carrying out another preferred embodiment of this invention.

With reference to FIG. 16, the main routine 400A is used instead of the main routine 400 (see FIG. 9). The main routines 400A and 400 are substantially the same so that like reference numerals are used to designate like process blocks throughout FIGS. 9 and 16. However, the main routine 400A has process blocks 402A, 404A, and 416A instead of process blocks 402, 404, and 416 of the main routine 400.

FIGS. 16, 10 and 17 illustrate a series of operations for carrying out the preferred embodiment of this invention. The process steps of FIGS. 16, 10 and 17 are periodically executed in brake controller 46 when stand-by braking mode is selected by SMMB switch 136 (see FIG. 7) after the ignition has been on and electric power has been applied to controller 46.

The process steps of FIGS. 16, 10 and 17 are carried out every ΔT (for example, 10 milliseconds) in controller 46 as provided through a standard computer timer-based interrupt process.

Each sequential execution of the microprocessor operations of FIG. 16 begins at "START" block and proceeds to process block 402A. In block 402A, the processor inputs or receives output signals from sensors, including pressure sensor 128, AC sensor 134 and vehicle speed sensor 138, from switches, including brake switch 132, SBBM switch 136, and from systems, including obstacle detection system 30, vehicle weight detection system 140, road friction coefficient (μ) determining system 150, road gradient (Rd) determining system 152 and transmission controller 148. The determined value of accelerator angle θ is stored as the newest one of a predetermined number of stored data after moving a sequence of the stored data to the right or left by overflowing the oldest one of the stored data. In the embodiment, the predetermined number of stored data is forty and the forty stored data are represented by $θ_0$, $θ_{-1}$, $θ_{-2}$, ... $θ_{-39}$, respectively, where $θ_0$ represents the newest stored datum, and $θ_{-39}$ represents the oldest stored datum. More specifically, the determined value θ in the present operation cycle is stored as $θ_0$. The forty stored data are processed in block 404A. In block 404A, the processor carries out a standard process of selecting or determining the maximum among the forty stored data $θ_0$, $θ_{-1}$, $θ_{-2}$, ... $θ_{-39}$ to update a maximum accelerator angle $θ_{MAX}$. Processing at block 404A provides the maximum $θ_{MAX}$ among forty sampled determined values of accelerator angle θ, which have been sampled over a period of time of 400 milliseconds that ends with beginning of each sequential execution of the microprocessor operations. Description on microprocessor operations at blocks 406, 408, 410, 412 and 414 is hereby omitted for brevity. In query at block 414, if flag $F_{PB}$ is set, the process proceeds to block 416A, and microprocessor operations 442, 444A, and 448–464 of sub-routine 440A, as illustrated in FIG. 17, are carried out. In query at block 414, if flag $F_{PB}$ is cleared or reset, the process proceeds to block 412, and processes to stop command are carried out. After block 416A or 412, the process skips to "RETURN" block in FIG. 16, The sub-routine 440A of FIG. 17 is substantially the same as the sub-routine 440 of FIG. 11 except the provision of process block 444A in the place of block 444.

Referring to FIG. 17, microprocessor operations at blocks 442, 444A, 446–464 are carried out to determine a target value $P_{PB}$ of brake pressure based on a parameter in the form of a product $F×θ_{MAX}$, which has been established based on forty stored data $θ_0$, $θ_{-1}$, $θ_{-2}$, ... $θ_{-39}$ sampled over a period of time of 400 milliseconds that ends with beginning of execution of the microprocessor operations upon determination at block 414 that operator braking action is imminent. More specifically, at process block 442, a stand-by braking start-up flag $F_{ST}$ is checked. Flag $F_{ST}$ set after execution of the initial operation cycle of sub-routine 440A. In query at block 442, if flag $F_{ST}$ is cleared or reset (answer "YES"), the process proceeds to block 444A and a base value $P_{PBO}$ of brake pressure is determined against parameter $θ_{MAX}×F$ and vehicle speed Vm. The process then proceeds to block 446 and flag $F_{ST}$ is set. The process proceeds next to block 448. In query at block 442, if flag $F_{ST}$ has been set (answer "NO"), the process skips to block 448. As flag $F_{ST}$ is initially reset during processing at block 444A, but it is set afterwards, the process skips from block 442 to block 448 during each of the subsequent operation cycles of sub-routine 440A.

At process block 444A, an appropriate base value $P_{PBO}$ of brake fluid is determined against parameter $θ_{MAX}×F$ and vehicle speed Vm.

With reference to FIG. 18, description is made on how to determine, at block 444A in the embodiment, an appropriate base value $P_{PBO}$ using parameter $θ_{MAX}×F$ and vehicle speed Vm. FIG. 18 is a graph depicting a filter having various ranges of values of a parameter in the form of product $θ_{MAX}×F$ against various values of vehicle speed Vm. Lines S1 and S2 illustrate variations of upper and lower extreme values of the ranges of the filter. As indicated by lines S1 and S2, upper and lower extreme values remain as high as $\theta_{MAX} \times F_{Hi\text{-}U}$ and $\theta_{MAX} \times F_{Hi\text{-}L}$, respectively, against various values of vehicle speed Vm lower than or equal to $Vm_{Lo}$, while they remain as high as $\theta_{MAX} \times F_{Lo\text{-}U}$ and $\theta_{MAX} \times F_{Lo\text{-}L}$, respectively, against various values of vehicle speed Vm higher than or equal to $Vm_{Hi}$. Against intermediate values of vehicle speed Vm between $Vm_{Lo}$ and $Vm_{Hi}$, the lines S1 and S2 have ramp-like sections, respectively, The ramp-like section of line S1 interconnects a level as high as $\theta_{MAX} \times F_{Hi\text{-}U}$ and a level as high as $\theta_{MAX} \times F_{Lo\text{-}U}$. The ramp-like section line S2 interconnects a level as high as $\theta_{MAX} \times F_{Hi\text{-}L}$ and a level as high as $\theta_{MAX} \times F_{Lo\text{-}L}$. The relationship is such that $Vm_{Hi} > Vm_{Lo}$. The relationship is such that $$\theta_{MAX} \times F_{Hi\text{-}U} > \theta_{MAX} \times F_{Hi\text{-}L} > \theta_{MAX} \times F_{Lo\text{-}U} > \theta_{MAX} \times F_{Lo\text{-}L},$$

and $$(\theta_{MAX} \times F_{Hi\text{-}U} \theta_{MAX} \times F_{Hi\text{-}L}) > (\theta_{MAX} \times F_{Lo\text{-}L} \theta_{MAX} \times F_{Lo\text{-}L})$$

As is readily seen from FIG. 18, the filter has a wide range, which covers relatively large values of parameter $\theta_{MAX} \times F$, when Vm is less than or equal to $Vm_{Lo}$, while it has a narrow range, which covers relatively small values of parameter $\theta_{MAX} \times F$, when Vm is greater than or equal to $Vm_{Hi}$. As Vm increases from $Vm_{Lo}$ toward $Vm_{Hi}$, the range of filter gradually becomes narrow and the coverage by the filter range shifts.

If a determined value of parameter $\theta_{MAX} \times F$ is greater than an upper extreme value, i.e., a point on line S1, selected against a determined value of vehicle speed Vm, a maximum base value $P_{PBO\ MAX}$ is set as base value $P_{PBO}$. If a determined value of parameter $\theta_{MAX} \times F$ is less than a lower extreme value, i.e., a point on line S2, selected against a determined value of vehicle speed Vm, a minimum base value $P_{PBO\ MIN}$ is set as base value $P_{PBO}$. In the embodiment, the setting is such that the maximum base value $P_{PBO\ MAX}$ is 0.5 MPa and the minimum base value $P_{PBO\ MIN}$ is 0.1 MPa.

Let us consider the case where a determined value of parameter $\theta_{MAX} \times F$ is less than or equal to an upper extreme value, i.e., a point on line S1, selected against a determined value of vehicle speed Vm, but greater than or equal to a lower extreme value, i.e., a point on line S2, selected against the determined value of vehicle speed Vm. In this case, the base value $P_{PBO}$ is determined by calculating the equation as follows:

$$P_{PBO} = (P_{PB\ MAX} - P_{PB\ MIN}) \times (\theta_{MAX} \times F - \theta_{MAX} \times F_{-L}) \div (\theta_{MAX} \times F_{-U} - \theta_{MAX} \times F_{-L}) + P_{PB\ MIN} \quad (5),$$

where:

$\theta_{MAX} \times F_{-U}$ is a general representation of an upper extreme value of a range selected against a determined value of vehicle speed Vm;

$\theta_{MAX} \times F_{-L}$ is a general expression of a lower extreme value of the range; and $\theta_{MAX} \times F^*$ represents a determined value of maximum longitudinal acceleration that falls in the range having the upper and lower extreme values $\theta_{MAX} \times F_{-U}$ and $\theta_{MAX} \times F_{-L}$.

In a stored look-up table in computer readable storage medium 104, upper and lower extreme values $\theta_{MAX} \times F_{-U}$ and $\theta_{MAX} \times F_{-L}$ are arranged or allocated against various values of vehicle speed Vm in a manner as illustrated by the upper and lower threshold lines S1 and S2 illustrated in FIG. 18. In the embodiment, this look-up table is used for microprocessor operations at block 444A in FIG. 17.

Referring back to FIG. 17, at block 444A, the processor determines base value $P_{PBO}$ of brake pressure through microprocessor operations, which include:

1) Performing a table look-up operation of the above-mentioned look-up table using a determined value of vehicle speed Vm to find or determine upper and lower extreme values $\theta_{MAX} \times F_{-U}$ and $\theta_{MAX} \times F_{-L}$ of a range appropriate to the determined value of vehicle speed Vm;

2) Comparing a determined product $\theta_{MAX} \times F$ to the determined upper and lower extreme values $\theta_{MAX} \times F_{-U}$ and $\theta_{MAX} \times F_{-L}$;

3) In the case (A*) where $\theta_{MAX} \times F_{-U} \geq \theta_{MAX} \times F \geq \theta_{MAX} \times F_{-L}$, determining base value $P_{PBO}$ by calculating the equation (5);

4) In the case (B*) where $\theta_{MAX} \times F < \theta_{MAX} \times F_{-L}$, setting that $P_{PBO} = P_{PBO\ MIN}$; and 5) In the case (C*) where $\theta_{MAX} \times F > \theta_{MAX} \times F_{-U}$, setting that $P_{PBO\ 1} = P_{PBO\ MAX}$.

After microprocessor operations at block 444A, the process proceeds to block 446 and then to block 448. Microprocessor operations at blocks 448–464 are the same as those of sub-routine 440 of FIG. 11. Thus, description on them is hereby omitted for brevity.

In the embodiments of this invention, application of stand-by braking torque is terminated upon operator depression of brake pedal (see blocks 462 and 464). If desired, application of stand-by braking torque may continue even after operator has depressed brake pedal.

In the embodiments of this invention, brake booster is utilized to regulate hydraulic brake pressure to accomplish a target value $P_{PB}$ of hydraulic brake pressure. This invention is not limited to this. If desired, a system hydraulic fluid pressure discharged by a pump may be regulated to provide the target value $P_{PB}$.

In the embodiments of this invention, a master cylinder is operated to produce hydraulic brake pressure for application of braking torque. This invention is not limited to this. If a powering system employs a traction motor/generator as a power source, a desired stand-by braking torque may be applied by regulating current passing through the motor.

While the present invention has been particularly described, in conjunction with preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 2000-247161, filed Aug. 17, 2000, the disclosure of which is hereby incorporated by reference in its entirety.

What is claimed is:

1. A method for controlling a stand-by braking torque applied to an automotive vehicle under a condition of approaching or following an obstacle preceding the vehicle, the automotive vehicle having a powering system for applying a driving torque to the vehicle in response to an operator power demand, the method comprising:

determining a variable indicative of dynamic situation of the vehicle;

sampling the determined values of the dynamic situation indicative variable immediately before an operator braking action to reduce the speed of the vehicle is imminent;

using the sampled values of the dynamic situation indicative variable as a basis to establish a parameter; and using the established parameter as a basis to determine a target value of stand-by braking torque, which is to be applied when the operator braking action to reduce the speed of the vehicle is imminent.

2. A method as claimed in claim 1, wherein the powering system includes an engine with various engine speeds and a transmission with various speed ratios between an input member driven by the engine and an output member drivingly coupled with at least one wheel of the vehicle, wherein a system for determining longitudinal acceleration, which the vehicle is subject to, is employed, and wherein the dynamic situation indicative variable is the determined longitudinal acceleration.

3. A system for controlling a stand-by braking torque applied to an automotive vehicle under a condition of approaching or following an obstacle preceding the vehicle, the automotive vehicle having a powering system for applying a driving torque to the vehicle in response to an operator power demand through an accelerator pedal, the system comprising:

a detection system for detecting a distance between the vehicle and the obstacle preceding the vehicle;

a sensor for detecting an operation parameter indicative of vehicle speed of the automotive vehicle;

a sensor for detecting a depressed angle of the accelerator pedal indicative of operator power demand;

a system for determining a longitudinal acceleration to which the automotive vehicle is subject to;

a braking system for application of braking toque to the vehicle in response to a brake signal; and a controller for determining whether or not an operator braking action to reduce the speed of the vehicle is imminent under a condition of approaching or following an obstacle preceding the vehicle based on the detected distance by the detection system, the vehicle speed, and the operator power demand, determining a target value of hydraulic brake pressure for stand-by braking torque based on the determined value of longitudinal acceleration before determination that the operator braking action is imminent, determining the brake signal for the determined target value of hydraulic pressure, and applying the determined brake signal to the braking system upon determination that the operator braking action is imminent.

4. A system as claimed in claim 3, wherein the controller samples the determined values of longitudinal acceleration for a predetermined period of time that ends with the determination that operator braking action is imminent and selects the maximum acceleration value among the sampled determined values of longitudinal acceleration, whereby the selected maximum acceleration value is used as a basis to determine the target value of hydraulic brake pressure.

5. A system as claimed in claim 3, wherein, with the same vehicle speed, the controller adjusts the target value of hydraulic brake pressure such that the greater the determined value of longitudinal acceleration is, the greater the determined target value of hydraulic brake pressure.

6. A system as claimed in claim 3, wherein the longitudinal acceleration determining system samples the detected values of depressed angle of the accelerator pedal in determining values of longitudinal acceleration.

7. A system as claimed in claim 3, wherein the controller adjusts the target value of hydraulic brake pressure such that the greater the vehicle speed is, the greater the target value of hydraulic brake pressure is.

8. A system as claimed in claim 3, wherein a system for detecting a vehicle weight of the motor vehicle is employed, and wherein the controller adjusts the target value of hydraulic brake pressure such that the greater the detected vehicle weight is, the less the target value of hydraulic brake pressure is.

9. A system as claimed in claim 3, wherein there is employed a system for detecting coefficient of friction between the road surface and the tire of at least one wheel of the automotive vehicle, and wherein the controller adjusts the target value of hydraulic brake pressure such that the less the detected coefficient of friction is, the less the target value of hydraulic brake pressure is.

10. A system as claimed in claim 3, wherein a system for detecting road gradient is employed, and wherein the controller adjusts the target value of hydraulic brake pressure such that, in the case where the detected road gradient is positive, the greater the magnitude of detected road gradient is, the greater the target value of hydraulic brake pressure is, and, in the case where the detected road gradient is negative, the greater the magnitude of detected road gradient is, the less the target value of hydraulic brake pressure is.

11. A system as claimed in claim 3, wherein the powering system includes an engine and a transmission with various speed ratios between an input member driven by the engine and an output member drivingly coupled with at least one wheel of the vehicle, wherein there is employed a system for detecting a speed ratio of the transmission, and wherein the controller adjusts the target value of hydraulic brake pressure such that the less the detected speed ratio is, the less the target value of the hydraulic brake pressure is.

12. A system as claimed in claim 3, wherein the powering system includes an engine and a transmission with various speed ratios between an input member driven by the engine and an output member drivingly coupled with at least one wheel of the vehicle, wherein there is employed a system for detecting a speed ratio of the transmission, wherein the longitudinal acceleration determining system samples the detected values of depressed angle of the accelerator pedal and samples the detected value of speed ratio and calculates a product of depressed angle of the accelerator pedal and speed ratio in determining values of longitudinal acceleration.

13. A system as claimed in claim 3, wherein the controller uses the determined value of longitudinal acceleration and the determined value of vehicle speed to find a base value of the target value of the hydraulic brake pressure, and corrects the base value with a vehicle weight of the vehicle, a coefficient of friction between the road surface and the tire of at least one wheel of the vehicle, and a road gradient of the road in determining the target value of hydraulic brake pressure.

14. A system as claimed in claim 13, wherein the base value falls in a band between a maximum base value of hydraulic brake pressure and a minimum base value of hydraulic brake pressure.

15. A system as claimed in claim 3, wherein the longitudinal acceleration determining system samples the detected values of depressed angle of the accelerator pedal and samples the detected value of speed ratio of a transmission of the powering system and calculates a product of depressed angle of the accelerator pedal and speed ratio in determining values of longitudinal acceleration, and wherein the controller uses the calculated value of product and the determined value of vehicle speed to find a base value of the target value of the hydraulic brake pressure, and corrects the base value with a vehicle weight of the vehicle, a coefficient of friction between the road surface and the tire of at least one wheel of the vehicle, and a road gradient of the road in determining the target value of hydraulic brake pressure.

16. A system as claimed in claim 15, wherein the base value falls in a band between a maximum base value of hydraulic brake pressure and a minimum base value of hydraulic brake pressure.

17. A method for controlling a stand-by braking torque applied to an automotive vehicle under a condition of approaching or following an obstacle preceding the vehicle, the automotive vehicle having a powering system for applying a driving torque to the vehicle in response to an operator power demand through an accelerator pedal, the method comprising:

detecting a distance between the vehicle and the obstacle preceding the vehicle;
   detecting an operation parameter indicative of vehicle speed of the automotive vehicle;
   detecting a depressed angle of the accelerator pedal indicative of operator power demand;
   determining a longitudinal acceleration to which the automotive vehicle is subject to;
   applying braking toque to the vehicle in response to a brake signal;
   determining whether or not an operator braking action to reduce the speed of the vehicle is imminent under a condition of approaching or following an obstacle preceding the vehicle based on the detected distance, the vehicle speed, and the operator power demand;
   determining a target value of hydraulic brake pressure for stand-by braking torque based on the determined value of longitudinal acceleration before determination that the operator braking action is imminent;
   determining the brake signal for the determined target value of hydraulic pressure; and
   applying the determined brake signal upon determination that the operator braking action is imminent.

18. A system for controlling a stand-by braking torque applied to an automotive vehicle under a condition of approaching or following an obstacle preceding the vehicle, the automotive vehicle having a powering system for applying a driving torque to the vehicle in response to an operator power demand through an accelerator pedal, the system comprising:

means for detecting a distance between the vehicle and the obstacle preceding the vehicle;
   means for detecting an operation parameter indicative of vehicle speed of the automotive vehicle;
   means for detecting a depressed angle of the accelerator pedal indicative of operator power demand;
   means for determining a longitudinal acceleration to which the automotive vehicle is subject to;
   means for applying braking toque to the vehicle in response to a brake signal;
   means for determining whether or not an operator braking action to reduce the speed of the vehicle is imminent under a condition of approaching or following an obstacle preceding the vehicle based on the detected distance, the vehicle speed, and the operator power demand;
   means for determining a target value of hydraulic brake pressure for stand-by braking torque based on the determined value of longitudinal acceleration before determination that the operator braking action is imminent;
   means for determining the brake signal for the determined target value of hydraulic pressure; and
   means for applying the determined brake signal upon determination that the operator braking action is imminent.

19. An automotive vehicle having a powering system for applying a driving torque to the vehicle in response to an operator power demand through an accelerator pedal, the automotive vehicle comprising:

a detection system for detecting a distance between the vehicle and the obstacle preceding the vehicle;
   a sensor for detecting an operation parameter indicative of vehicle speed of the automotive vehicle;
   a sensor for detecting a depressed angle of the accelerator pedal indicative of operator power demand;
   a system for determining a longitudinal acceleration to which the automotive vehicle is subject to;
   a braking system for application of braking toque to the vehicle in response to a brake signal; and
   a controller for determining whether or not an operator braking action to reduce the speed of the vehicle is imminent under a condition of approaching or following an obstacle preceding the vehicle based on the detected distance by the detection system, the vehicle speed, and the operator power demand, determining a target value of hydraulic brake pressure for stand-by braking torque based on the determined value of longitudinal acceleration before determination that the operator braking action is imminent, determining the brake signal for the determined target value of hydraulic pressure, and applying the determined brake signal to the braking system upon determination that the operator braking action is imminent.

20. A computer readable storage medium having information stored thereon representing instructions executable by a brake controller to control stand-by braking torque, the computer readable storage medium comprising:

instructions for determining a variable indicative of dynamic situation of the vehicle;
   instructions for sampling the determined values of the dynamic situation indicative variable immediately before an operator braking action to reduce the speed of the vehicle is imminent;
   instructions for establishing a parameter based on the sampled values of the dynamic situation indicative variable; and
   instructions for using the established parameter to determine a target value of stand-by braking torque.

* * * * *